US012687715B2

(12) United States Patent
Wang et al.

(10) Patent No.: US 12,687,715 B2
(45) Date of Patent: Jul. 21, 2026

(54) OPTICAL SYSTEM AND OPTICAL CAMERA WORKING AT FAR-INFRARED WAVEBAND

(71) Applicant: SHENZHEN METALENX TECHNOLOGY CO., LTD, Shenzhen (CN)

(72) Inventors: Chunyu Wang, Shenzhen (CN); Heshan Lin, Shenzhen (CN); Xiang Li, Shenzhen (CN); Zhenyu Yang, Shenzhen (CN); Chenglong Hao, Shenzhen (CN); Fengze Tan, Shenzhen (CN); Jian Zhu, Shenzhen (CN)

(73) Assignee: SHENZHEN METALENX TECHNOLOGY CO., LTD, Shenzhen (CN)

( * ) Notice: Subject to any disclaimer, the term of this patent is extended or adjusted under 35 U.S.C. 154(b) by 202 days.

(21) Appl. No.: 18/811,758

(22) Filed: Aug. 21, 2024

(65) Prior Publication Data

US 2025/0085533 A1 Mar. 13, 2025

(30) Foreign Application Priority Data

Sep. 13, 2023 (CN) .......................... 202311177983.1
Sep. 13, 2023 (CN) .......................... 202322483251.7

(51) Int. Cl.
*G02B 27/00* (2006.01)
*H04N 23/20* (2023.01)
*H04N 23/55* (2023.01)

(52) U.S. Cl.
CPC ......... *G02B 27/0025* (2013.01); *H04N 23/20* (2023.01); *H04N 23/55* (2023.01)

(58) Field of Classification Search
CPC ..... G02B 27/0025; H04N 23/20; H04N 23/55
USPC .......................................................... 359/738
See application file for complete search history.

(56) References Cited

U.S. PATENT DOCUMENTS

| | | | | |
|---|---|---|---|---|
| 11,092,271 B2 * | 8/2021 | Nakano | ................... | F16L 11/11 |
| 12,259,616 B1 * | 3/2025 | Diorio, Jr. | ......... | G02F 1/133636 |
| 2023/0314809 A1 * | 10/2023 | Wang | ................ | G02B 27/0172 359/630 |

FOREIGN PATENT DOCUMENTS

CN          106443938          2/2017

* cited by examiner

*Primary Examiner* — Mohammed A Hasan
(74) *Attorney, Agent, or Firm* — JCIPRNET

(57) ABSTRACT

An optical system and an optical camera working at a far-infrared waveband are provided, the optical system along the optical axis from the objection side to the image side includes: a metalens and a spherical lens; the metalens is configured to correct higher-order residual wavefront aberrations; the spherical lens is configured to correct lower-order primary wavefront aberrations; the metalens and the spherical lens are configured to correct aberrations; an absolute value of the curvature radius of an objection-side surface towards the objection side for the spherical lens is greater than an absolute value of the curvature radius of an image-side surface towards the image side for the spherical lens; the optical system satisfies the following condition: $0.83 \leq f/D \leq 0.92$; where f is an effective focal length of the optical system, and D is the entrance pupil diameter of the optical system.

19 Claims, 29 Drawing Sheets

OPTICAL SYSTEM AND OPTICAL CAMERA WORKING AT FAR-INFRARED WAVEBAND

CROSS-REFERENCE TO RELATED APPLICATIONS

This application claims the benefit of priority from Chinese Patent Application serial no. 202311177983.1 and no. 202322483251.7, filed on Sep. 13, 2023. The entirety of each of the above-mentioned patent applications is hereby incorporated by reference herein and made a part of this specification.

TECHNICAL FIELD

The present disclosure relates to a field of an optical camera, in particular to an optical system and an optical camera working at a far-infrared waveband.

BACKGROUND

The optical system containing the optical lens and the optical camera containing the optical system are widely applied to various fields in our life, and the fields include photograph field, intelligent home field and smart intelligent field. The optical systems provided in the related technology are usually containing traditional refractive lenses. This kind of optical system is difficult to satisfy the requirements of the field of view, imaging quality and total track length at the same time.

SUMMARY

In order to solve the above technical problem, an optical system and an optical camera are provided according to the present application. The optical system provided by the present application is capable of ensuring imaging quality and satisfying the requirement for the field of view. Meanwhile the total track length of the optical system reduces significantly.

In the first aspect, an optical system working at a far-infrared waveband is provided, where the optical system along the optical axis from the objection side to the image side includes: a metalens and a spherical lens;

the metalens is configured to correct a plurality of higher-order residual wavefront aberrations;

the spherical lens is configured to correct a plurality of lower-order primary wavefront aberrations;

the metalens and the spherical lens are configured to correct a plurality of aberrations;

an absolute value of the curvature radius of an objection-side surface towards the objection side for the spherical lens is greater than an absolute value of the curvature radius of an image-side surface towards the image side for the spherical lens;

the optical system satisfies the following condition expression:

$$0.83 \leq f/D \leq 0.92$$

where f is an effective focal length of the optical system, and D is the entrance pupil diameter of the optical system.

In one embodiment, the optical system further satisfies:

$$4.2 < f_M \Delta\varphi/R_M < 6.9$$

where $f_M$ is a focal length of the metalens; $\Delta\varphi$ is the biggest phase variation of the metalens at a single wavelength; $R_M$ is an effective radius of the metalens.

In one embodiment, the optical system further satisfies:

$$1.0 < r_1/r_2 < 2.8$$

where $r_1$ is the curvature radius of the objection-side surface towards the objection side for the spherical lens, $r_2$ is the curvature radius of the image-side surface towards the image side for the spherical lens.

In one embodiment, the optical system further satisfies:

$$0.40 \leq R_M/R_G \leq 0.55$$

where $R_M$ is an effective radius of the metalens, and $R_G$ is an effective radius of the spherical lens.

In one embodiment, the optical system further satisfies:

$$1 < f_M/f \leq 1.85$$

where $f_M$ is a focal length of the metalens.

In one embodiment, the optical system further satisfies:

$$1.25 \leq f_G/f \leq 1.75$$

where $f_G$ is a focal length of the spherical lens.

In one embodiment, the optical system further satisfies:

$$3.3 \leq n_M \leq 4.3$$

$$3.3 \leq n_G \leq 4.3$$

where $n_M$ is a refractive index of the metalens, $n_G$ is a refractive index of the spherical lens.

In one embodiment, the optical system further includes: an aperture slot; the aperture slot is set on a surface of the metalens; or an interval is set between the aperture slot and the metalens.

In one embodiment, a relative illumination at the overall field of view of the optical system is greater than 60%.

In one embodiment, the metalens and the spherical lens are made of intrinsic silicon.

In one embodiment, a plurality of nanostructures are set on the image-side surface of the metalens.

In the second aspect, an optical camera working at a far-infrared waveband is provided, where the optical camera includes the optical system claimed as claim 1 and an imaging detector;

the imaging detector is setting on the image-side surface towards the image side for the metalens.

In one embodiment, the optical camera includes an optical window glass, and the optical window glass is set between the optical system and the imaging detector.

In one embodiment, the optical window glass is set between the spherical lens and the imaging detector.

The present application controls the f/D between 0.83 and 0.92, which can ensure the imaging quality and satisfy the requirement of the field of view. The metalens has a smaller thickness than the traditional refractive lens, and the optical system in the related technology includes at least two refractive lenses. Thus the total track length of the optical system including the metalens and the spherical lens provided by the present application has reduced significantly. Therefore, the optical system provided by the present application is capable of ensuring the imaging quality and satisfying the requirement of the field of view. Meanwhile the total track length of the optical system reduces significantly.

It should be understood that the above description is general, and the detailed description described below are exemplary only, and will not limit this application.

DETAILED DESCRIPTION OF THE EMBODIMENTS

Figure 1:
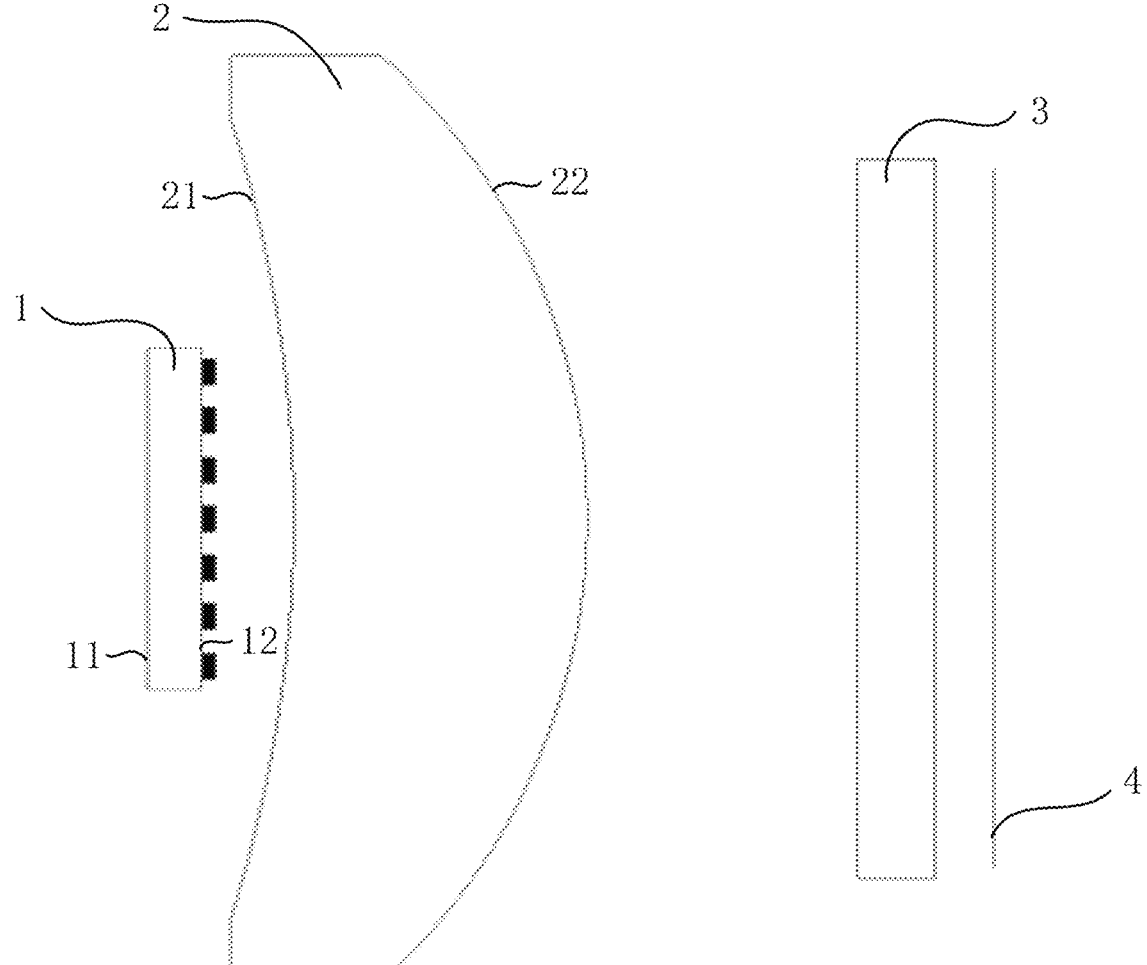
FIG. 1 shows a schematic diagram of the architectural layout of the optical system and the optical camera working at the far-infrared waveband in one embodiment provided by the present application.

Embodiments will be described herein in detail, examples of which are represented in the accompanying drawings. When the following description relates to the accompanying drawings, the same numerals in different accompanying drawings indicate the same or similar elements unless otherwise indicated. The embodiments described in the following exemplary embodiments do not represent all embodiments consistent with the present application. Rather, they are only examples of devices and methods consistent with some aspects of this application as detailed in the appended claims.

The term used herein is used only for the purpose of describing the specific embodiment and is not intended to be a limitation. The "a", "an", "this" and "one" do not represent a limit on the quantity in the disclosure. It is intended to include both singular and plural. For example, "one part" has the same meaning as "at least one part" unless the context clearly indicates otherwise. "At least one" should not be interpreted as limiting to the quantity "one". "Or" means "and/or". The term "and/or" includes any and all combinations of one or more of the associated listed items.

It should be understood that although the terms first, second, and third, etc. may be used to describe various information, such information should not be limited to these terms. These terms are used only to separate the same type of information from each other. For example, without leaving the scope of the present application, the first information may also be referred to as second information, and similarly, the second information may also be referred to as first information. Depending on the context, as the word "if" used here can be interpreted as "when . . . " or "when . . . " or "responsive to the certainty." In the case of no conflict, the following embodiment and the embodiments may be combined with each other.

In the fields of intelligent home, intelligent security and so on, "performing a living perception in the indoor environment" is an important part. For example, in the field of intelligent home, the presence of living organisms in the house, and the matching procedure to provide intelligent home service to the household.

Although the indoor environment is generally relatively stable, there are two situations of night and day. In order to enable "performing a living perception in the indoor environment" to adapt to both night and day, the optical camera works in the far-infrared waveband, namely 8~12 μm, to perceive living organisms from the heat source, so as to avoid the influence of different environments. At the same time, because the indoor environment is usually static, in order to include the whole indoor environment into the perception range as far as possible, the FOV (field of view) of the optical system needs to be as large as possible, so as to cover the perception range as far as possible by less number of the optical lenses.

The optical system in the optical camera in the related technology is generally containing traditional lenses. In order to ensure the imaging quality and larger FOV of the optical system at the same time, it is inevitably necessary to stack the refractive lenses. So the TTL (total track length) will increase significantly as the number of the refractive lenses increases. As the TTL of the optical system increases, the volume and the weight of the optical system also increase significantly. This characteristic of the optical system in the related technology obviously can't meet the requirements of miniaturization and lightweight in the present society for optical devices.

As mentioned above, the optical system in the related technology has the disadvantages of "the optical system is difficult to meet the requirements of the FOV, imaging quality and TTL at the same time". In order to overcome the disadvantages, this application provides an optical system working at the far-infrared waveband and an optical camera containing the optical system. The optical system provided in the present application meets the requirements of a larger FOV while ensuring excellent imaging quality, and significantly reduces the TTL.

As mentioned above, the optical system in the related technology has the disadvantages of "the optical system is difficult to meet the requirements of the FOV, imaging quality and TTL at the same time". In order to overcome the disadvantages, this application provides an optical system working at the far-infrared waveband and an optical camera containing the optical system. The optical system provided in the present application meets the requirements of a larger FOV while ensuring excellent imaging quality, and significantly reduces the TTL.

FIG. 1 shows a schematic diagram of the architectural layout of the optical system and the optical camera working at the far-infrared waveband in one embodiment provided by the present application. In FIG. 1, the optical system along the optical axis from the left to the right is the direction of from the objection side to the image side includes: a metalens and a spherical lens.

The metalens is an optical modulation element that a plurality of nanostructures are set on its substrate; the metasurface consists of nanostructures arranged in array. According to the phase modulation method, the various parameters of the nanostructures can be configured adaptively by matching with phase modulation formulas, so that the metalens 1 can achieve the corresponding optical performance.

In general, the primary lower-order wavefront aberrations refer to orders from 1-2, and the residual higher-order wavefront aberrations refer to order 3 and higher orders. And the metalens and the spherical lens are configured together to correct a plurality of chromatic aberrations.

In the present application, the spherical lens includes two curve surfaces: an objection-side surface towards the objection side 21 and an image-side surface towards the image side 22. The objection-side surface towards the objection side 21 and the image-side surface towards the image side 22 are perpendicular to the optical axis. Where the absolute value of the curvature radius of the objection-side surface towards the objection side for the spherical lens is greater than the absolute value of the curvature radius of the image-side surface towards the image side for the spherical lens. And the optical system satisfies:

$$0.83 \le f/D \le 0.92$$

Where f is an effective focal length of the optical system, and D is the entrance pupil diameter of the optical system.

In one embodiment, f/D is the F number and is used to control the light intake of the optical system. It should be noted that the value of f/D can't be too large, unless the value of f/D will reduce the light intake and the utilization efficiency of the optical energy will decrease, thus the imaging quality will be bad; at the same time, the value of f/D can't be too small, unless the value of f/D will lead to the overall large aberration of the optical system. The applicants of this application have found that, the optical system can ensure good imaging quality and make the FOV satisfy: 100°≤FOV≤120°, by controlling the f/D within the interval of 0.83-0.92. And the optical system can satisfy the requirements of a larger FOV.

It should be noted that the thickness of the metalens is reduced significantly than that of the refractive lens. Compared with the optical system in related technology, the TTL of the optical system including a metalens and a refractive lens provided by the present application has been reduced significantly. As can be seen, the optical system provided by the present application can ensure good imaging quality and satisfy the requirement of a larger FOV, and the TTL of the optical system will be reduced significantly.

In one embodiment, the optical system provided by the present application also satisfy the following condition expression:

$$4.2 < f_M \Delta\varphi / R_M < 6.9$$

where $f_M$ is a focal length of the metalens; $\Delta\varphi$ is the biggest phase variation of the metalens at a single wavelength; $R_M$ is an effective radius of the metalens.

Specifically, a single wavelength refers to a single wavelength of the far-infrared waveband. At the single wavelength, different positions of the metalens generally will provide different phases. In the present embodiment, the condition will limit the relationship between the focal length of the metalens, the largest phase variation of the metalens and the effective radius of the optical system, so as to make the metalens have an outstanding effect of phase matching, to show the optical performance of the metalens more fully, to reduce the processing difficulty, and to increase the availability of metalens.

In one embodiment, the optical system further satisfies the following condition expression:

$$1.0 < r_1 / r_2 < 2.8$$

where $r_1$ is the curvature radius of the objection-side surface towards the objection side for the spherical lens, $r_2$ is the curvature radius of the image-side surface towards the image side for the spherical lens.

It should be noted that $|r_1|$ is greater than $|r_2|$, so as to ensure the spherical lens is capable of providing enough focal power. However, if the value of $r_1/r_2$ is too large, when the lights are incident from the spherical lens 2 to the image plane, the incident angles will be too large, thus the wavefront aberrations will be too large. Therefore, the lowest value of $r_1/r_2$ is configured to be 1.0, so as to make the spherical lens provide enough focal power to focus lights on the image plane. And the relative illumination will keep a higher level all the time. And the highest value of $r_1/r_2$ is configured to be 2.8, so as to limit the wavefront aberrations as improves the relative illumination. In this way, the larger wavefront produced by the optical system will be avoided.

In one embodiment, the optical system may further satisfy the following condition expression:

$$0.40 \leq R_M / R_G \leq 0.55$$

where $R_M$ is an effective radius of the metalens, and $R_G$ is an effective radius of the spherical lens.

It should be noted that the ratio of effective radius $R_M/R_G$ will directly influence the aperture of the optical system. Therefore, the range of $R_M/R_G$ will be limited within [0.40, 0.55] to limit the aperture of the optical system, so as to reduce the volume of the optical system as far as possible.

In one embodiment, the optical system further satisfies:

$$1 < f_M / f \leq 1.85$$

where $f_M$ is a focal length of the metalens.

It should be noted the focal power provided by the metalens is larger, the dispersion of the optical system will be larger. And the focal power provided by the metalens 1 in the optical system is less than the focal power of the optical system. Thus it is easy for the nanostructures on the metalens to match the target phase. Therefore, in the embodiment of the present application, the lowest value of $f_M/f$ is configured to be 1, and focal power provided by the metalens of the optical system is less than the focal power of the optical system. Thus it is easy for the nanostructures in the metalens to match the target phase. And it can also avoid the metalens provided larger focal length, so as to avoid too much dispersion for the optical system.

And in the present application, the highest value of $f_M/f$ is configured to be 1.85, so as to ensure that the metalens 1 has enough focal power to modulate the lights within the TTL provided by the optical system.

In one embodiment, the optical system further satisfies:

$$1.25 \leq f_G / f \leq 1.75$$

where $f_G$ is a focal length of the spherical lens.

It should be noted that in the optical system provided by the present optical system, the thickness of the spherical lens will be influenced significantly by the focal power provided by the spherical lens of the optical system. Therefore, the lowest value of $f_G/f$ is configured to be 1.75 to avoid the lowest limit ability of the focal power provided by the spherical lens, so that the metalens 1 avoids to provide too large focal power in some case; if the metalens 1 needs to provide a larger focal power, the nanostructures on the metalens 1 are difficult to match with the target phase of the design requirement, and will produce too larger aberration. Therefore, good imaging quality can be ensured by configuring the highest value of $f_G/f$.

In one embodiment, the optical system also satisfies:

$$0.2 \, \text{mm} \leq d_M \leq 0.375 \, \text{mm}$$

Where in $d_M$ is the central thickness of the metalens.

In one embodiment, the optical system satisfy:

$$1.2 \, \text{mm} \leq d_G \leq 2.25 \, \text{mm}$$

Where $d_G$ is the central thickness of the spherical lens.

It should be noted that the metalens 1 in the optical system will cause a significant negative dispersion, so the spherical lens needs to compensate for the negative dispersion by providing some positive dispersion. Therefore, the lowest value is configured to be 1.2 mm to satisfy the balance requirement of dispersion. And the highest value of the $d_G$ is configured to be 2.25 mm to avoid the too large thickness of the spherical lens, which will limit the TTL of the optical system.

In one embodiment, the optical system provided by the present application further satisfy:

$$3.3 \leq n_M \leq 4.3$$

$$3.3 \leq n_G \leq 4.3$$

where $n_M$ is a refractive index of the metalens, $n_G$ is a refractive index of the spherical lens.

Preferably, according to the ability to transmit light in the far infrared band and the processing cost, the material of the metalens and the spherical lens is intrinsic silicon. That is to say, the $n_M$ and $n_G$ is 3.42 at wavelength of 10 µm.

In one embodiment, the optical system includes an aperture slot; the aperture slot is set on a surface of the metalens. Or an interval is set between the aperture slot and the metalens.

In the present embodiment, an aperture slot is set in the optical system to control the light intake. The aperture slot may be set on the objection-side surface towards the objection side of the metalens, and the objection-side surface towards the objection side towards the objection side. The aperture slot may be set on the image-side surface towards the image side of the metalens, and the image-side surface towards the image side. Or an interval may be set between the aperture slot and the metalens. But the interval between the aperture slot and the metalens only has air, and will not have other elements.

In one embodiment, the metasurface of the metalens is set on the image-side surface towards the image side 21 of the metalens. That is to say, the metasurface is located at the inside of the optical system to avoid exposure to the external environment. In this way, the nanostructures on the metasurface will be effectively protected.

An optical camera working at a far-infrared waveband is provided by the present application, and the optical camera includes any above optical system of the above embodiments. The detailed design of the optical system will not be described here. As shown in FIG. 1, the optical camera provided in this application includes an optical system with a metalens 1 and a spherical lens 2, and an imaging detector 4 sets on the image-side surface of the metalens. The lights at the far-infrared waveband are modulated by the metalens 1 and the spherical lens 2, and are received and imaged by the imaging detector 4.

It should be noted that when the optical camera is used to perform a living perception in the indoor environment, due to the space distance of the indoor environment is relatively limited, the working distance of the optical system is a few meters away, there is no need for high-resolution imaging detectors. Low-resolution imaging detectors can also achieve good effect of application, while the cost will be reduced.

In one embodiment, in the optical camera provided by the present application, the optical camera includes an optical window glass, and the optical window glass is set between the optical system and the imaging detector. The optical window glass is used to protect the optical system and the imaging detector 4.

In one embodiment, the material of the optical window glass is silicon.

TABLE 1

| Target requirements for the various system parameters of the optical system | |
|---|---|
| System Parameters | Target Requirements |
| Working waveband(µm) | 8~12 |
| f/D | 0.9 |
| FOV(°) | ≥100 |
| TTL(mm) | ≤5 |

In one embodiment, the material of the optical window glass is silicon. Table 1 shows the target requirements for the various system parameters of the optical system. In detail, the optical system is working at the far-infrared waveband, namely 8-12 µm; The target requirement of f/D is close to 0.9; the target requirement is ≥100°; the target requirement is ≤5 mm.

Embodiment 1

Figure 2:
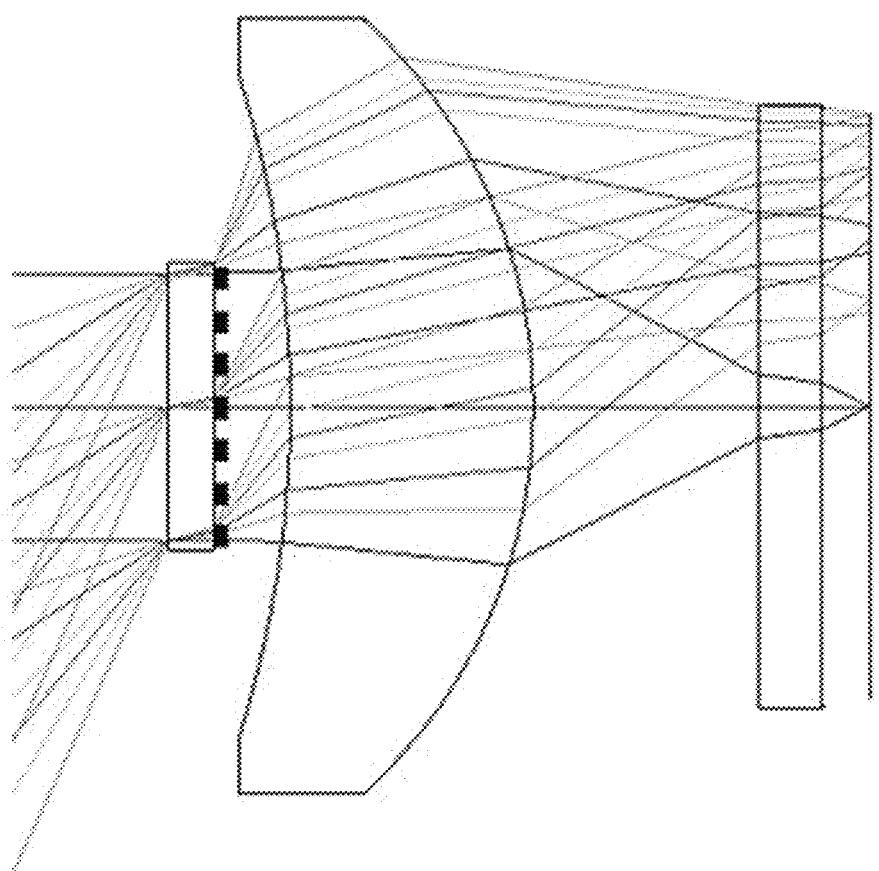
FIG. 2 shows a schematic diagram of the architectural layout of the optical system and the optical camera working at the far-infrared waveband in one embodiment provided by the present application.

FIG. 2 shows a schematic diagram of the architectural layout of the optical system and the optical camera working at the far-infrared waveband in one embodiment provided by the present application. As shown in FIG. 2, in embodiment 1, the optical camera along the optical axis from the objection side to the image side includes the optical system, optical window glass, and the imaging detector. Where the optical camera along the optical axis from the objection side to the image side includes: the aperture slot, the metalens and the spherical lens. The aperture slot is set on the objection-side surface towards the objection side of the metalens.

TABLE 2

| Target requirements for the various system parameters of the optical system | |
|---|---|
| System Parameters | Optical system provided by embodiment 1 |
| Effective focal length of the optical system f (mm) | 1.4926 |
| Exit pupil diameter of the optical system D (mm) | 1.756 |
| f/D | 0.85 |
| FOV(°) | ≥117 |
| TTL(mm) | 4.608 |
| Relative Illumination | >60% |

As can be seen from the Table 2, the F number (f/D) is only 0.85, which can improve the light intake of the optical system significantly. In the case that the imaging detector has a low response to the optical energy, the optical energy into the optical system is collected as much as possible, so as to ensure excellent imaging quality. At the same time, the FOV of the optical system is greater than or equal to 117°, and can satisfy the requirement of a larger FOV. At the same time, the TTL of the optical system is 4.608 mm, which can satisfy the requirements of small volume and light weight. At the same time, the relative illumination at all FOV is greater than 60%, which basically meets the requirements of the optical system for imaging brightness.

Along the direction from the objection side to the image side, each surface of the optical system is numbered, and after summarizing the parameters of each surface, Table 3 is obtained as shown below.

TABLE 3

| Number | Type of surface | Radius of curvature (mm) | Thickness (mm) | Material |
|---|---|---|---|---|
| 1 | Objection plane | Infinite | Infinite | — |
| 2 (Aperture slot) | Sphere plane | Infinite | 0.3 | Si |
| 3 | Metalens | Infinite | 0.4988 | — |
| 4 | Sphere plane | −7.2313 | 1.5971 | Si |
| 5 | Sphere plane | −3.4800 | 1.4774 | — |
| 6 | Sphere plane | Infinite | 0.425 | Si |
| 7 | Sphere plane | Infinite | 0.31 | — |
| 8 | Image plane | Infinite | — | — |

The surface 1 is an objection plane, and the objection plane is a sphere with an infinite radius of curvature, that is to say, the objection plane is a plane. The distance between the objection plane and the objection-side surface of the metalens is uncertain, so the distance between the objection plane and the objection-side surface of the metalens is defined to be infinite. And the material between the objection plane and the objection-side surface of the metalens is air. The surface 2 is objection-side surface of the metalens, and the surface 2 and the aperture slot are in the same plane. The surface 2 is a plane. The distance between the surface 2 and the image-side surface of the metalens is 0.3 mm, and the metalens is made of silicon. The surface 3 is the image-side surface of the metalens, and the surface 3 is plane. The distance between the surface 3 and the objection-side surface of the spherical lens is 0.4988 mm, and air is filled between the surface 2 and the image-side surface of the metalens. The surface 4 is the objection-side surface of the spherical lens, and the curvature radius is −7.2313 mm, and the distance between the surface 4 and the image-side surface of the spherical lens is 1.5971 mm, and the material between the surface 4 and the image-side surface of the spherical lens is silicon. The surface 5 is the image-side surface of the spherical lens, its curvature radius is −3.4800, and the distance between the surface 5 and the objection-side surface of the optical window glass is 1.4774 mm, and air is filled between the surface 5 and the objection-side surface of the optical window glass.

Figure 3:
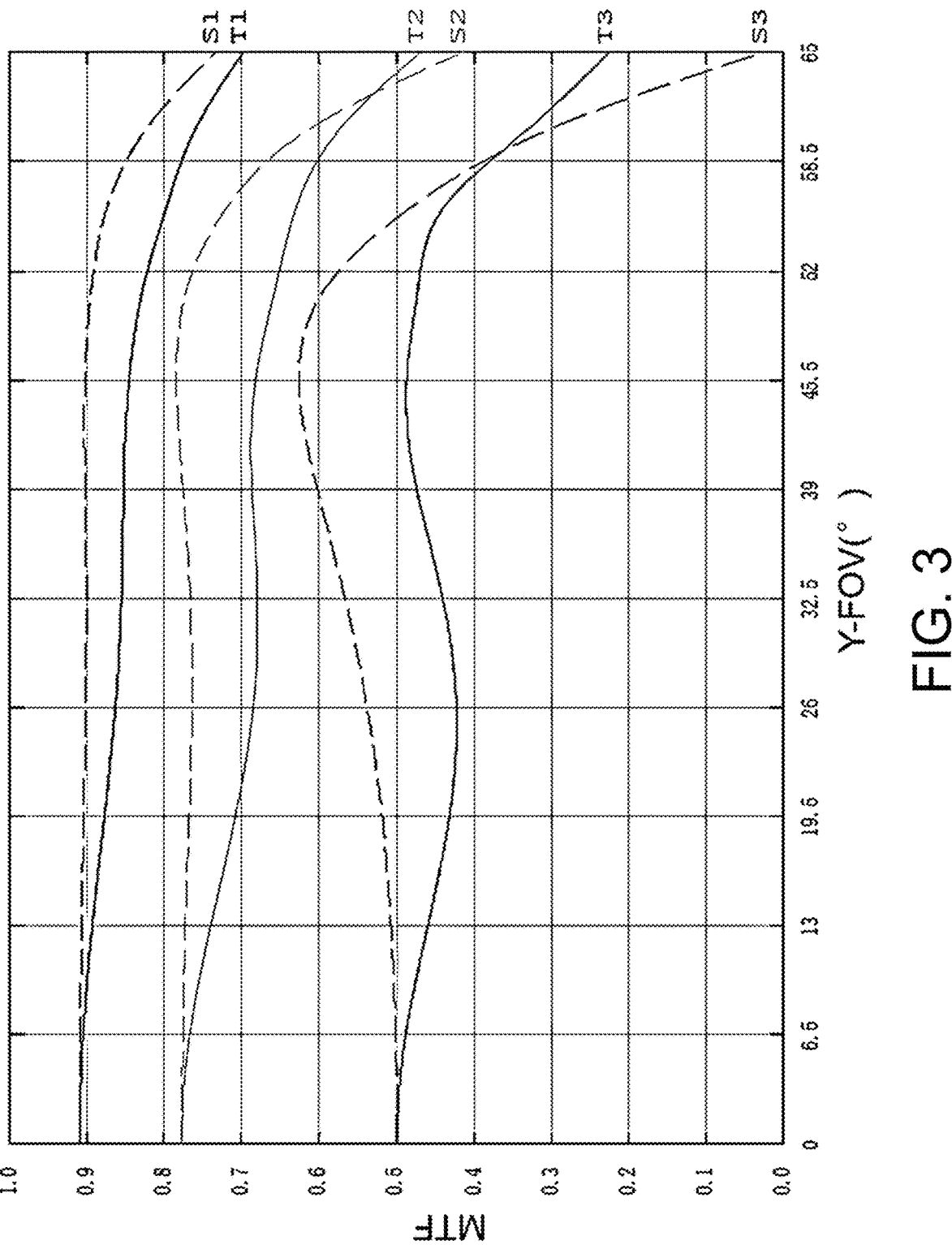
FIG. 3 shows a curve diagram between the MTF and field of view of the optical system working at the far-infrared waveband in one embodiment provided by the present application.

FIG. 3 shows a curve diagram between the MTF and the field of view of the optical system working at the far-infrared waveband in one embodiment provided by the present application. MTF is a modulation transfer function, which is an important indicator used to describe the imaging quality of optical systems. The larger MTF value indicates a better imaging quality. Referring to FIG. 3, in this embodiment, the pixel size in the specification is 35 μm, and the Nyquist frequency n of the optical system is obtained as 1000/(2*35)≈14 lp/mm. Therefore, FIG. 3 shows the sagittal image curve S1 for MTF variation with the FOV changes and the meridional image curve T1 at spatial frequency of 3.51 lp/mm; the sagittal image curve S2 for MTF variation with the FOV changes and the meridional image curve T2 at spatial frequency of 7 lp/mm; the sagittal image curve S3 for MTF variation with the FOV changes and the meridional image curve T3 at spatial frequency of 14 lp/mm. From these six curves, the MTF of the optical system in the FOV of 58.5° is greater than 0.3 all the time, which meets the MTF of the design requirement in good imaging quality. Where, Y, represents the field in the direction of the Y axis.

It is further stated that the optical system has an MTF of 0.25 at 14 lp/mm in the maximum FOV of 117°, an MTF of 0.49 at 14 lp/mm for 0.8 FOV of 93.6°, and an MTF of 0.5 at 14 lp/mm for half of FOV of 58.5°.

Further, it is verified that the defocus MTF of the optical system at the spatial frequency of 14 lp/mm is greater than 0.4, when the defocus range is ±0.05 mm and in half of FOV of ≤58.5°, which indicates that the optical system is insensitive to rear focus and has excellent imaging stability; the maximum meridional field curve is 2.083 mm, the maximum arc field curve is 0.2897 mm, and the maximum optical distortion at the maximum FOV is −52%.

Figure 4:
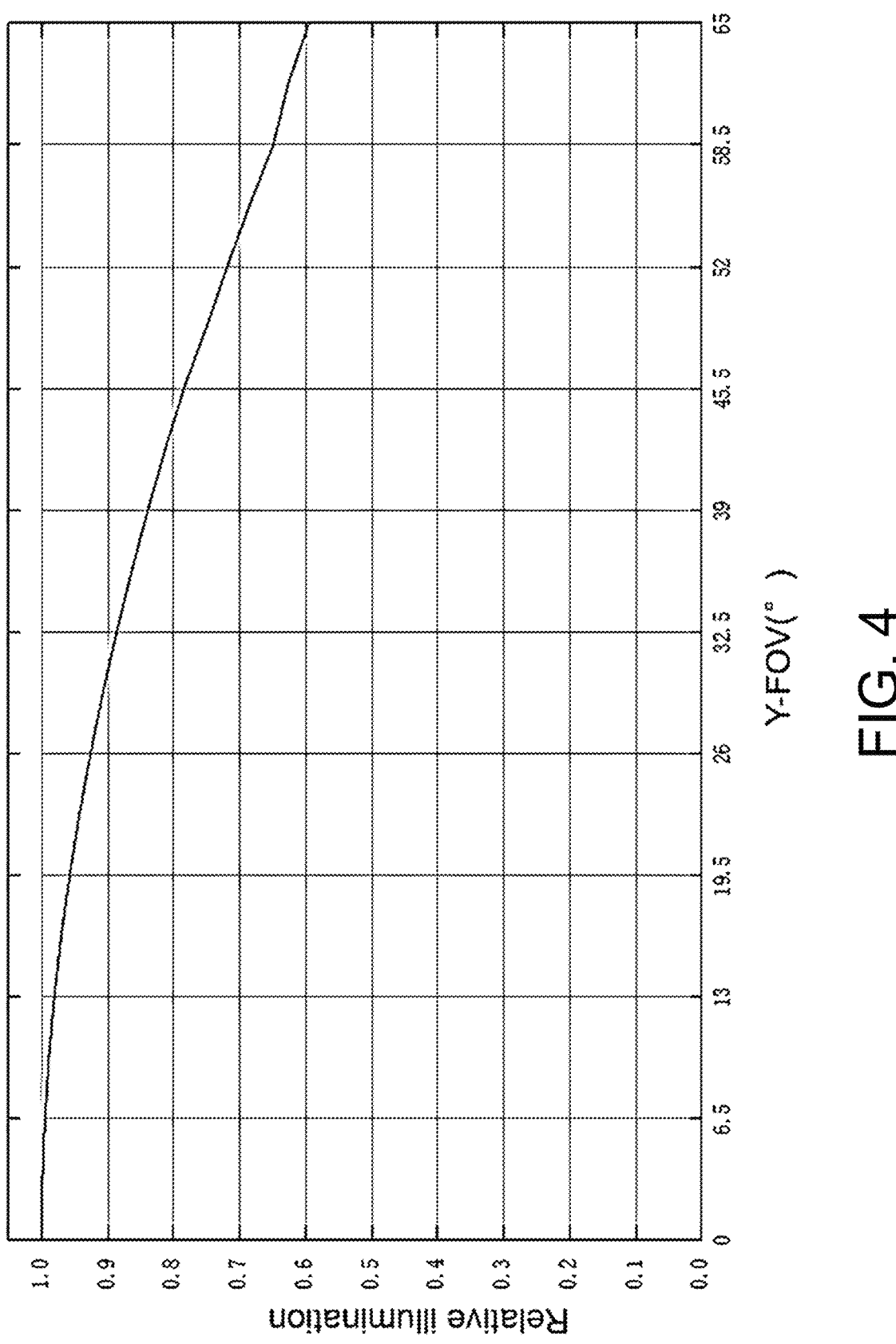
FIG. 4 a curve diagram of the relative illumination of the optical system working at the far-infrared waveband in one embodiment provided by the present application.

FIG. 4 shows a curve diagram of the relative illumination of the optical system working at the far-infrared waveband in one embodiment provided by the present application. As can be seen in FIG. 4, the relative illumination of the optical system in the present application is greater than 60% all the time. And the transition of the relative illumination curve from 0 to the maximum FOV is gentle without mutation, which indicates that the relative illumination of the optical system varies evenly from center to edge, which meets the requirements of the relative illumination in the excellent imaging quality standard.

Figure 5:
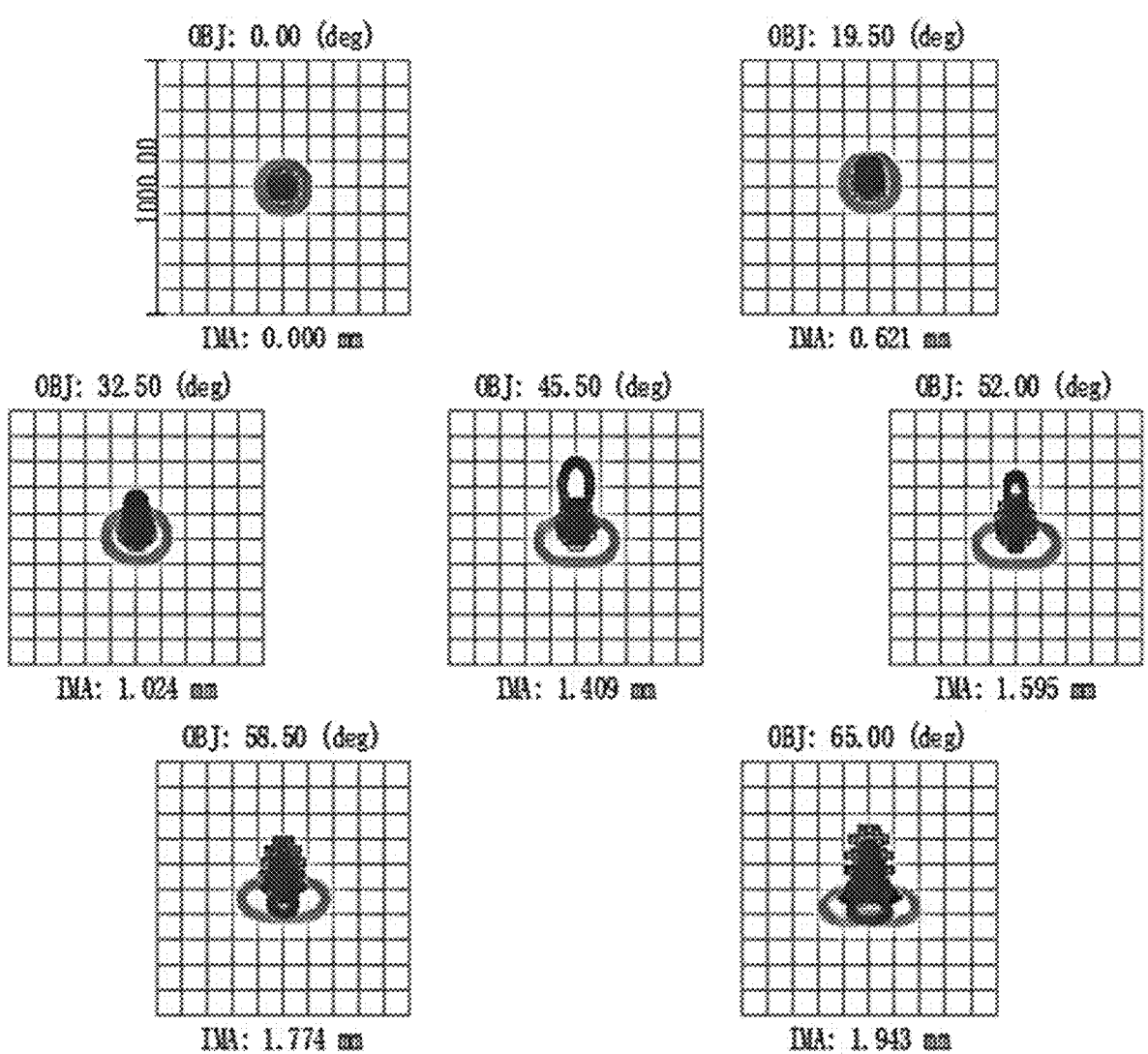
FIG. 5 shows a spot diagram of the optical system working at the far-infrared waveband in one embodiment provided by the present application.

FIG. 5 shows a spot diagram of the optical system working at the far-infrared waveband in one embodiment provided by the present application. As can be seen in FIG. 5, the optical system of this embodiment, the maximum RMS radius of the spot diagram is about 2 pixels (70 μm), the 0 field is about 1 pixel (35 μm), and the half of FOV within 58.5° is less than 2 pixels, indicating that the imaging spot of the optical system is small.

Figure 6:
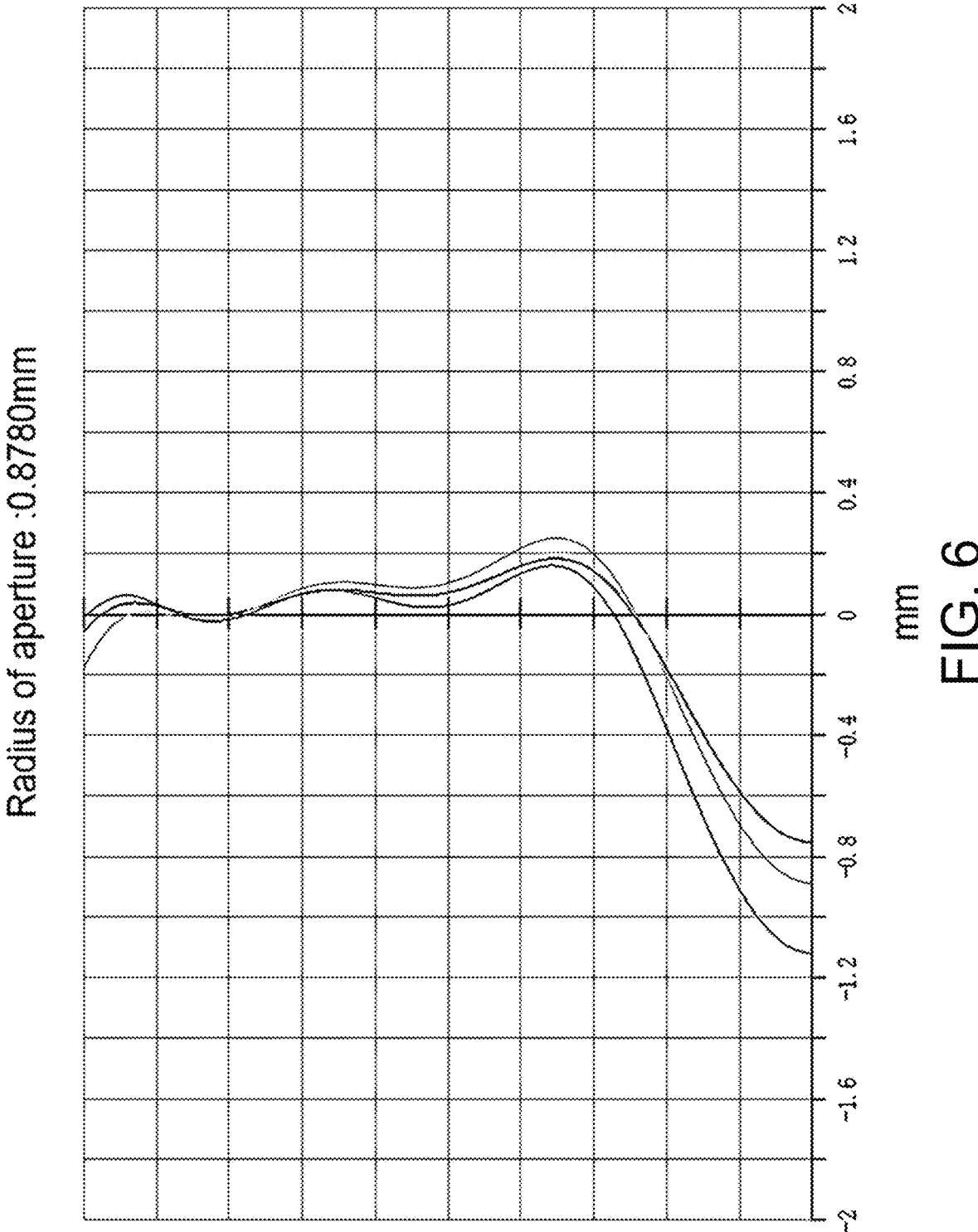
FIG. 6 shows a curve diagram along the optical axis of the wavefront aberration of the optical system working at the far-infrared waveband in one embodiment provided by the present application.

FIG. 6 shows a curve diagram along the optical axis of the wavefront aberration of the optical system working at the far-infrared waveband in one embodiment provided by the present application. As shown in FIG. 6, in the order of the intersection with the horizontal axis from left to right, the three curves in FIG. 6 correspond to 8 μm, 10 μm and 12 μm. As can be seen from FIG. 6, the optical system in this embodiment has the maximum axial wavefront aberration of 0.3667 mm.

Figure 7:
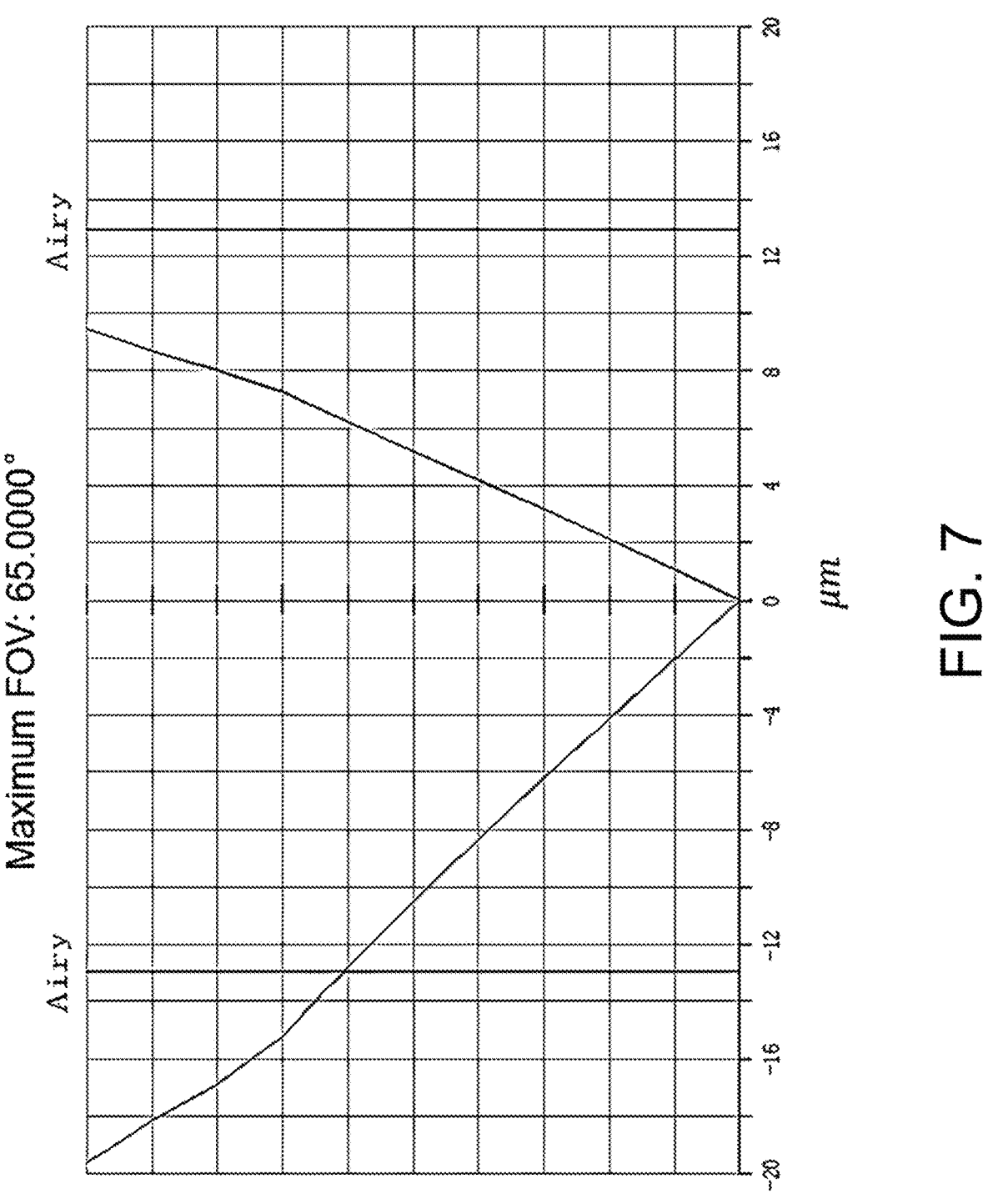
FIG. 7 shows a vertical curve diagram of the chromatic aberration of the optical system working at the far-infrared waveband in one embodiment provided by the present application.

FIG. 7 shows a vertical curve diagram of the chromatic aberration of the optical system working at the far-infrared waveband in one embodiment provided by the present application. Referring to FIG. 6, the optical system in this embodiment has the maximum vertical axial chromatic aberration of 29.045 μm, which is less than one pixel.

Figure 8:
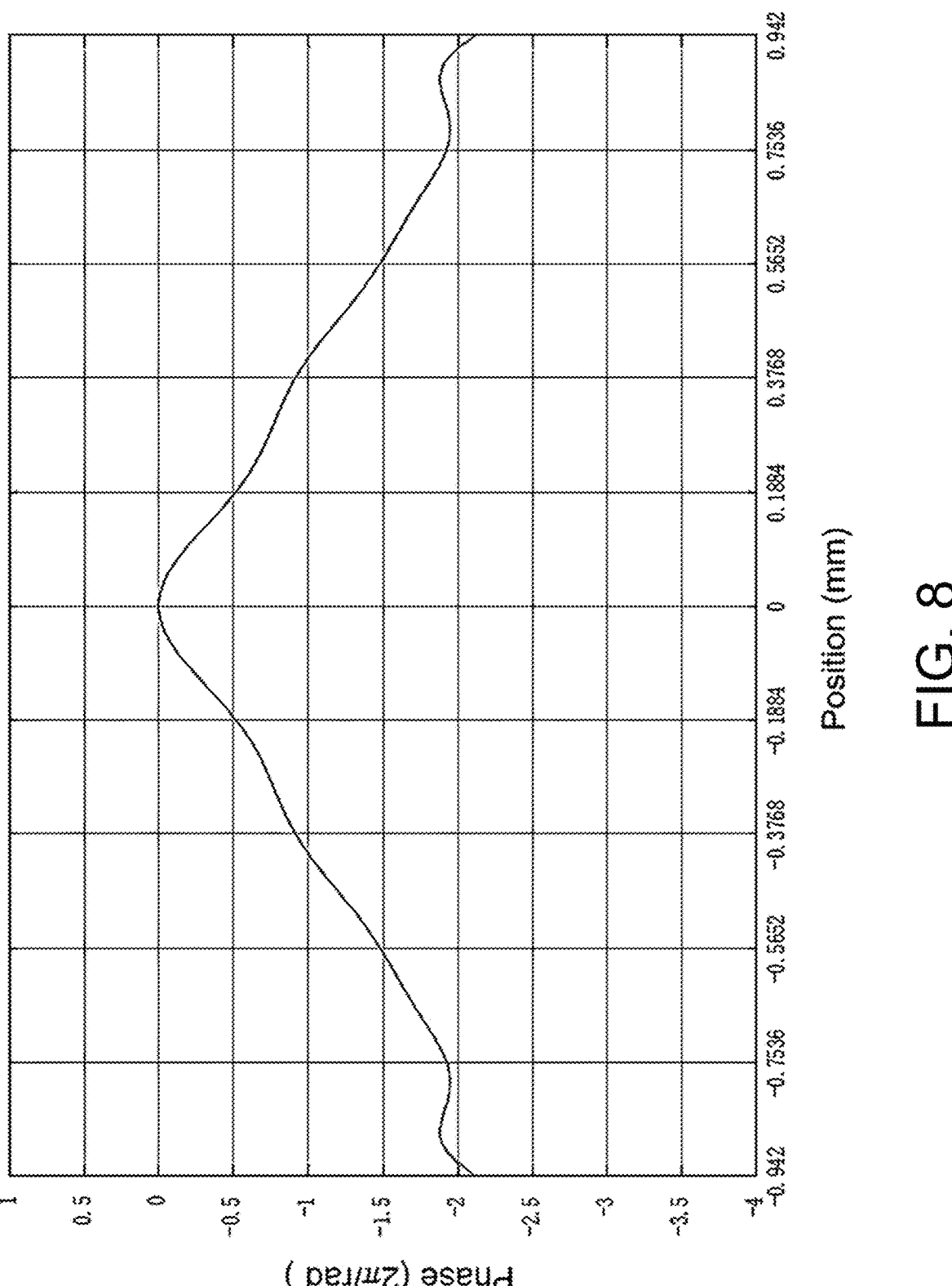
FIG. 8 shows a diagram of the phase distribution of the metalens.

FIG. 8 shows a diagram of the phase distribution of the metalens. The horizontal axis of the phase distribution represents the distance between any position of the metalens and center of the metalens; the vertical axis of the phase represents any position of the metalens at the central wavelength of the far-infrared waveband. As shown in FIG. 8, the optical system in this embodiment provides the maximum phase variation between the phase at the center wavelength of the far-infrared waveband and from center of the metalens to edge of the metalens is 2.1 periodicities(2π).

Embodiment 2

Figure 9:
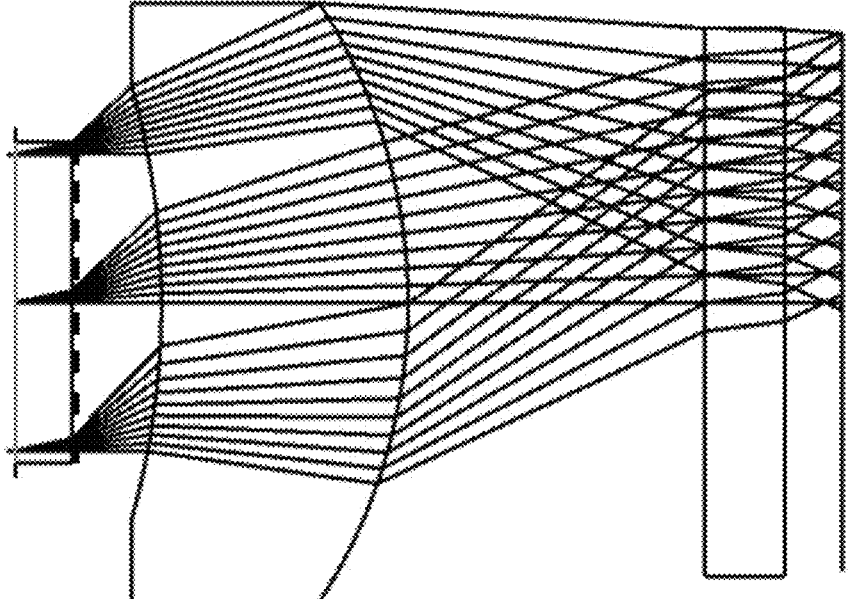
FIG. 9 shows a schematic diagram of the architectural layout of the optical system and the optical camera working at the far-infrared waveband in one embodiment provided by the present application.

FIG. 9 shows a schematic diagram of the architectural layout of the optical system and the optical camera working at the far-infrared waveband in one embodiment provided by the present application. As shown in FIG. 9, in the embodiment 2, the optical camera along the optical axis from the objection side to the image side includes: the optical system, optical window glass, imaging detector. Where the optical camera along the optical axis from the objection side to the image side includes: the aperture slot, the metalens and the spherical lens. The aperture slot is set on the objection-side surface towards the objection side of the metalens.

TABLE 4

Target requirements for the various system parameters
of the optical system by embodiment 2

| System Parameters | Optical system provided by embodiment 2 |
| --- | --- |
| Effective focal length of the optical system f (mm) | 1.42 |
| Exit pupil diameter of the optical system D (mm) | 1.546 |
| f/D | 0.92 |
| FOV(°) | ≥118 |
| TTL(mm) | 4.4 |
| Relative Illumination | >65% |

As can be seen from the Table 4, the F number (f/D) is 0.92, which can improve the light intake of the optical system significantly to ensure the good imaging quality. At the same time, the FOV of the optical system is greater than or equal to 118°, and can satisfy the requirement of larger FOV. At the same time, the TTL of the optical system is 4.4 mm, which can satisfy the requirement of small volume and light weight. At the same time, the relative illumination at all FOV is greater than 65%, which basically meets the requirements of the optical system for imaging brightness.

Along the direction from the objection side to the image side, each surface of the optical system is numbered, and after summarizing the parameters of each surface, Table 5 is obtained as shown below.

TABLE 5

| Number | Type of surface | Radius of curvature (mm) | Thickness (mm) | Material |
| --- | --- | --- | --- | --- |
| 1 | Objection plane | Infinite | Infinite | — |
| 2 (Aperture slot) | Sphere plane | Infinite | 0.3 | Si |
| 3 | Metalens | Infinite | 0.478 | — |
| 4 | Sphere plane | −4.081 | 1.31 | Si |
| 5 | Sphere plane | −2.814 | 1.576 | — |
| 6 | Sphere plane | Infinite | 0.425 | Si |
| 7 | Sphere plane | Infinite | 0.31 | — |
| 8 | Image plane | Infinite | — | — |

Similarly, in the description of Table 3, Table 5 will not be described here.

Figure 10:
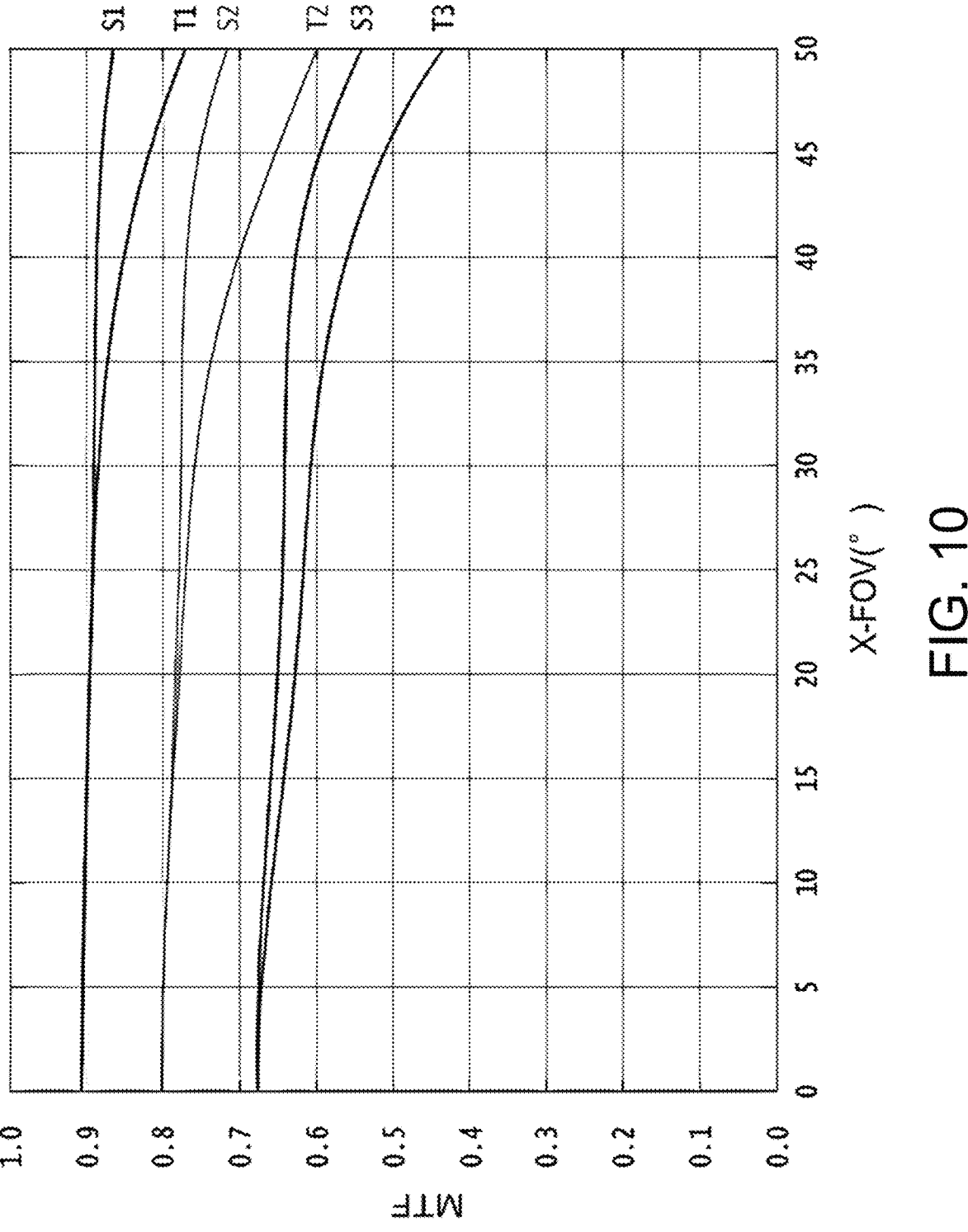
FIG. 10 shows a curve diagram between the MTF and field of view of the optical system working at the far-infrared waveband in one embodiment provided by the present application.

FIG. 10 shows a curve diagram between the MTF and field of view of the optical system working at the far-infrared waveband in one embodiment provided by the present application. Where the X field, representing the field in the X axis direction. In this embodiment 2 has the same principle as the description of the curve diagram between the MTF and FOV in embodiment 1, and will not be repeated here.

It should be noted that the optical system in this embodiment has an MTF of 0.20 at a cut-off frequency of 14 lp/mm of maximum FOV of 118°, an MTF of 0.48 at a cut-off frequency of 14 lp/mm and 0.8 times of FOV of 94.4°, and an MTF of 0.61 at a cutoff frequency of 14 lp/mm and half of FOV of 59°.

Figure 11:
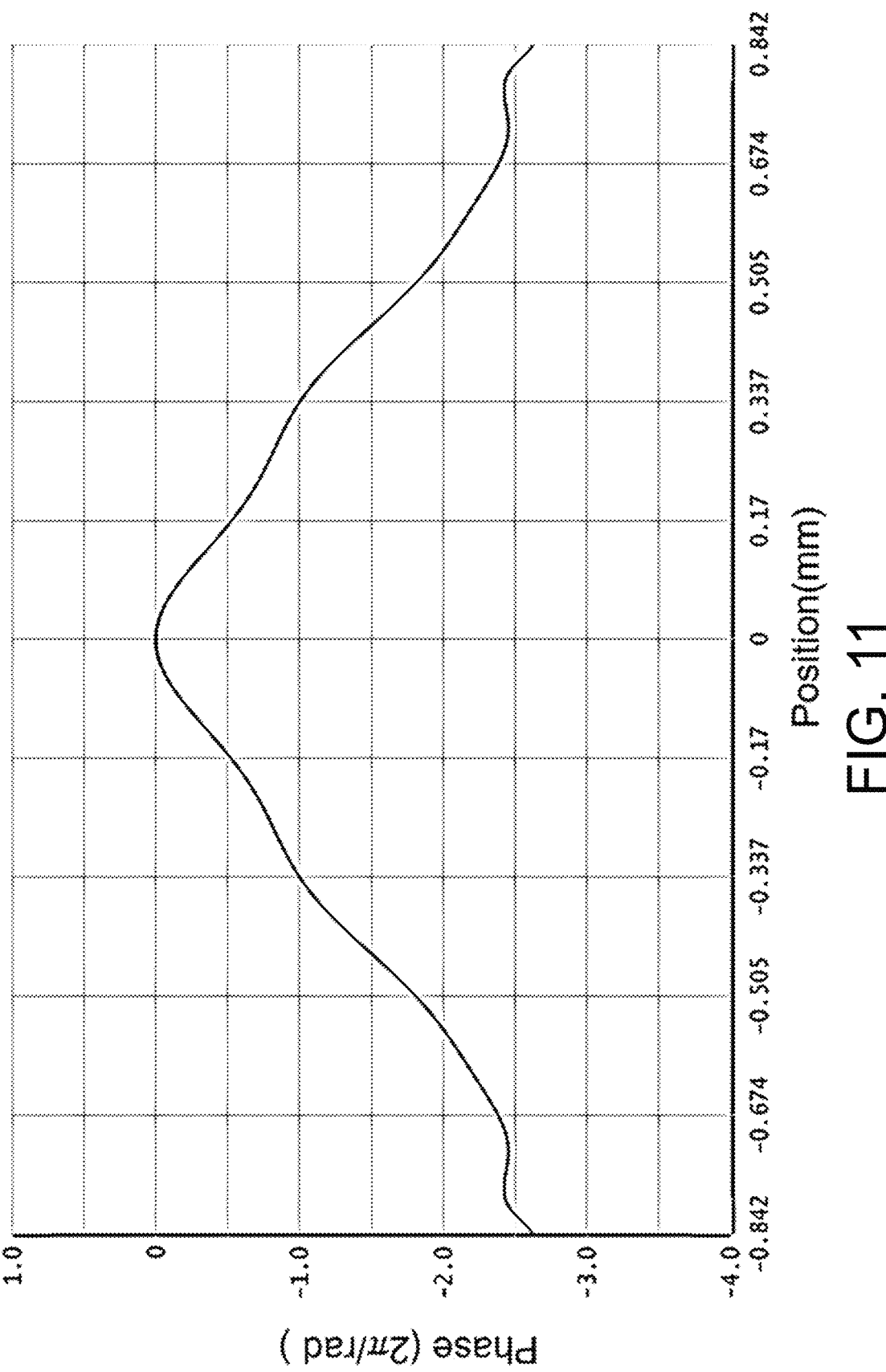
FIG. 11 shows a diagram of the phase distribution of the metalens.

FIG. 11 shows a diagram of the phase distribution of the metalens. The horizontal axis of the phase distribution represents the distance between any position of the metalens and the metalens center; the vertical axis of the phase represents any position of the metalens at the central wavelength of the far-infrared waveband. As shown in FIG. 11, the optical system in this embodiment provides the maximum phase variation between the phase at the center wavelength of the far-infrared waveband and from the center of the metalens to the edge of the metalens is 2.6 periodicities (2π).

Embodiment 3

Figure 12:
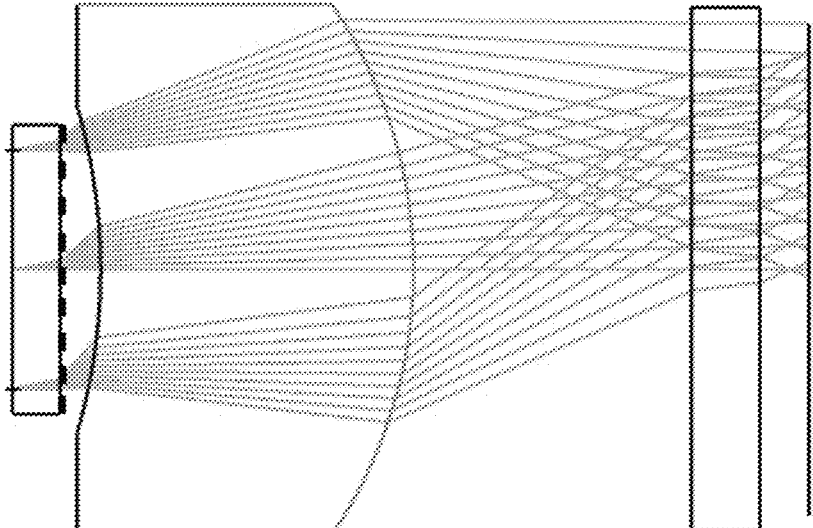
FIG. 12 shows a schematic diagram of the architectural layout of the optical system and the optical camera working at the far-infrared waveband in one embodiment provided by the present application.

FIG. 12 shows a schematic diagram of the architectural layout of the optical system and the optical camera working at the far-infrared waveband in one embodiment provided by the present application. As shown in FIG. 12, in the embodiment 3, the optical camera along the optical axis from the objection side to the image side includes: the optical system, optical window glass, imaging detector. Where the optical camera along the optical axis from the objection side to the image side includes: the aperture slot, the metalens and the spherical lens. The aperture slot is set on the objection-side surface towards the objection side of the metalens.

TABLE 6

Target requirements for the various system parameters
of the optical system by embodiment 3

| System Parameters | Optical system provided by embodiment 3 |
| --- | --- |
| Effective focal length of the optical system f (mm) | 1.4 |
| Exit pupil diameter of the optical system D (mm) | 1.558 |
| f/D | 0.9 |
| FOV(°) | ≥117 |
| TTL(mm) | 5 |
| Relative Illumination | >61% |

As can be seen from the Table 4, the F number (f/D) is 0.9, which can improve the light intake of the optical system significantly to ensure the good imaging quality. At the same time, the FOV of the optical system is greater than or equal to 117°, and can satisfy the requirement of larger FOV. At the same time, the TTL of the optical system is 5 mm, which can satisfy the requirement of small volume and light weight. At the same time, the relative illumination at all FOV is greater than 61%, which basically meets the requirements of the optical system for imaging brightness.

Along the direction from the objection side to the image side, each surface of the optical system is numbered, and after summarizing the parameters of each surface, Table 7 is obtained as shown below.

TABLE 7

| Number | Type of surface | Radius of curvature (mm) | Thickness (mm) | Material |
| --- | --- | --- | --- | --- |
| 1 | Objection plane | Infinite | Infinite | — |
| 2 (Aperture slot) | Sphere plane | Infinite | 0.3 | Si |
| 3 | Metalens | Infinite | 0.252 | — |
| 4 | Sphere plane | −3.91 | 1.97 | Si |
| 5 | Sphere plane | −3.17 | 1.75 | — |
| 6 | Sphere plane | Infinite | 0.425 | Si |
| 7 | Sphere plane | Infinite | 0.31 | — |
| 8 | Image plane | Infinite | — | — |

Similarly, in the description of Table 3, Table 7 will not be described here.

Figure 13:
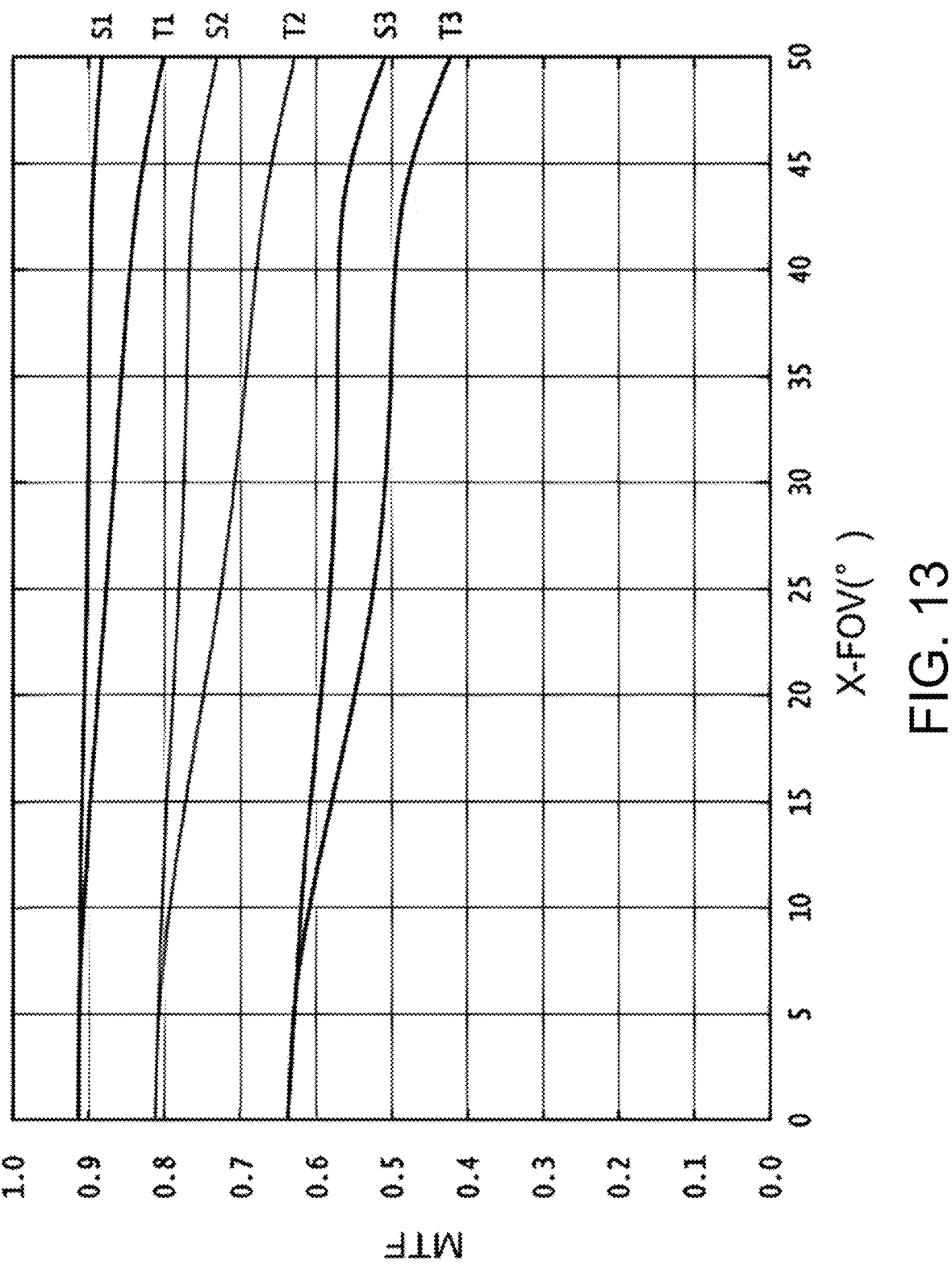
FIG. 13 shows a curve diagram between the MTF and field of view of the optical system working at the far-infrared waveband in one embodiment provided by the present application.

FIG. 13 shows a curve diagram between the MTF and field of view of the optical system working at the far-infrared waveband in one embodiment provided by the present application. Similarly, this embodiment 2 has the same principle as the description of the curve diagram between the MTF and FOV in embodiment 1, and will not be repeated here.

It should be noted that the optical system in this embodiment has an MTF of 0.20 at a cut-off frequency of 14 lp/mm of maximum FOV of 117°, an MTF of 0.22 at a cut-off frequency of 14 lp/mm and 0.8 times of FOV of 93.6°, and an MTF of 0.46 at a cut-off frequency of 14 lp/mm and the half of FOV of 58.5°.

Figure 14:
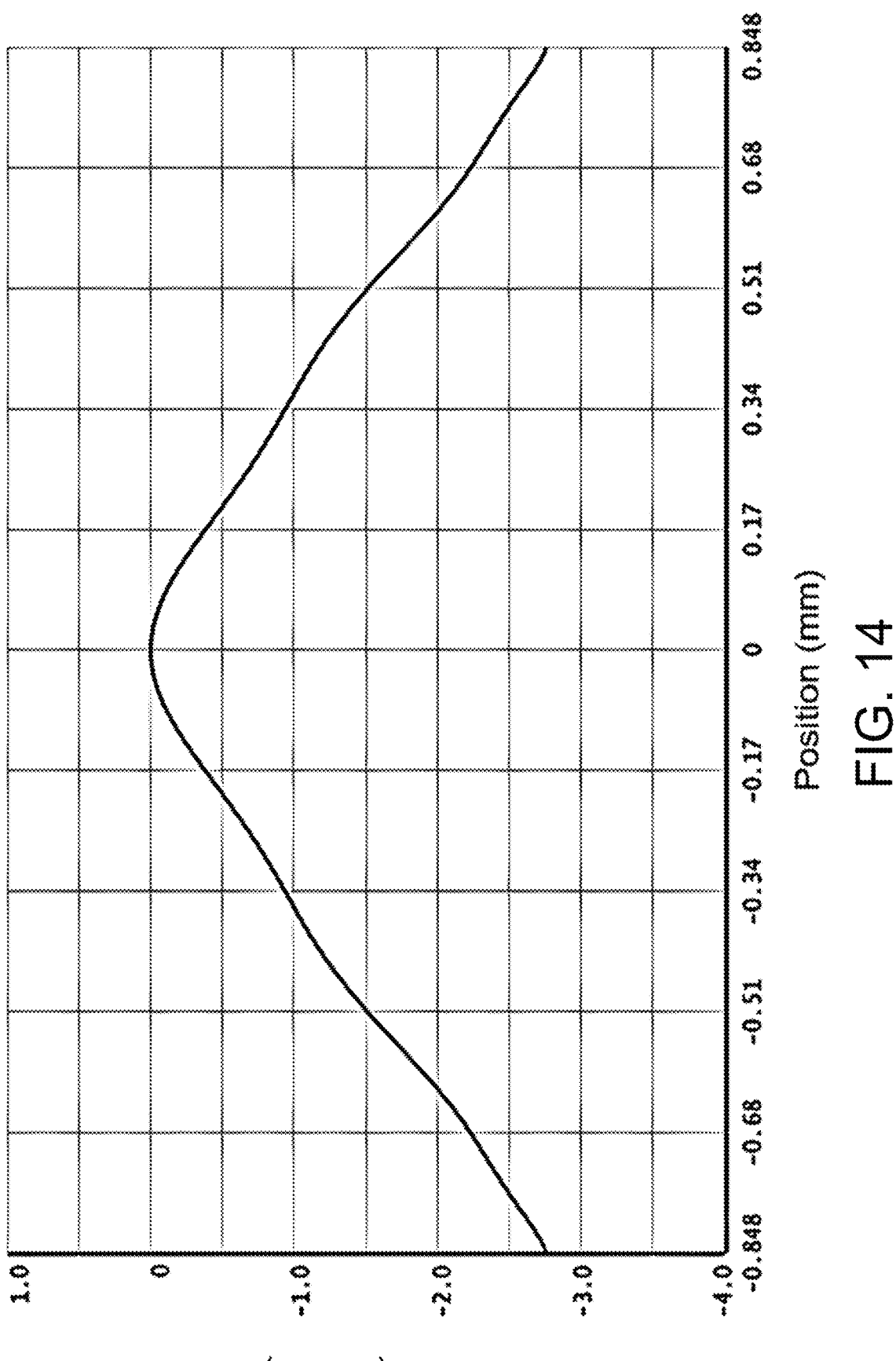
FIG. 14 shows a diagram of the phase distribution of the metalens.

FIG. 14 shows a diagram of the phase distribution of the metalens. The horizontal axis of the phase distribution represents the distance between any position of the metalens and the metalens center; the vertical axis of the phase represents any position of the metalens at the central wavelength of the far-infrared waveband. As shown in FIG. 14, the optical system in this embodiment provides the maximum phase variation between the phase at the central wavelength of the far-infrared waveband and from the center of the metalens to the edge of the metalens is 2.75 periodicities(2π).

Embodiment 4

Figure 15:
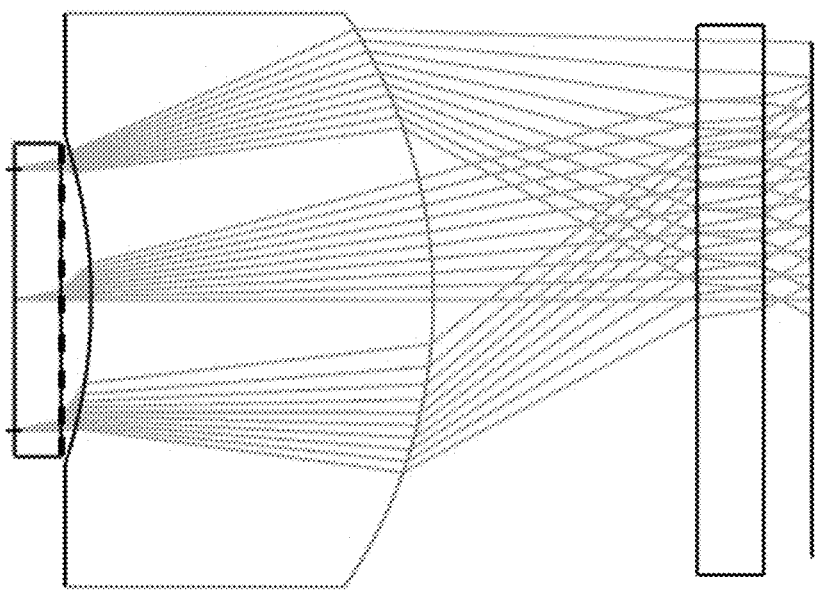
FIG. 15 shows a schematic diagram of the architectural layout of the optical system and the optical camera working at the far-infrared waveband in one embodiment provided by the present application.

FIG. 15 shows a schematic diagram of the architectural layout of the optical system and the optical camera working at the far-infrared waveband in one embodiment provided by the present application. As shown in FIG. 15, in the embodiment 4, the optical camera along the optical axis from the objection side to the image side includes: the optical system, optical window glass, imaging detector. Where the optical camera along the optical axis from the objection side to the image side includes: the aperture slot, the metalens and the spherical lens. The aperture slot is set on the objection-side surface towards the objection side of the metalens.

TABLE 8

| | Target requirements for the various system parameters of the optical system by the present embodiment 4 | |
|---|---|
| System Parameters | Optical system provided by embodiment 4 |
| Effective focal length of the optical system f (mm) | 1.5 |
| Exit pupil diameter of the optical system D (mm) | 1.664 |
| f/D | 0.901 |
| FOV(°) | ≥102 |
| TTL(mm) | 5 |
| Relative Illumination | >71% |

As can be seen from the Table 4, the F number (f/D) is 0.901, which can improve the light intake of the optical system significantly to ensure the good imaging quality. At the same time, the FOV of the optical system is greater than or equal to 102°, and can satisfy the requirement of larger FOV. At the same time, the TTL of the optical system is 5 mm, which can satisfy the requirement of small volume and light weight. At the same time, the relative illumination at all FOV is greater than 71%, which basically meets the requirements of the optical system for imaging brightness.

Along the direction from the objection side to the image side, each surface of the optical system is numbered, and after summarizing the parameters of each surface, Table 8 is obtained as shown below.

TABLE 8

| Number | Type of surface | Radius of curvature (mm) | Thickness (mm) | Material |
|---|---|---|---|---|
| 1 | Objection plane | Infinite | Infinite | — |
| 2 (Aperture slot) | Sphere plane | Infinite | 0.3 | Si |
| 3 | Metalens | Infinite | 0.195 | — |
| 4 | Sphere plane | −3.325 | 2.20 | Si |
| 5 | Sphere plane | −3.205 | 1.70 | — |
| 6 | Sphere plane | Infinite | 0.425 | Si |
| 7 | Sphere plane | Infinite | 0.31 | — |
| 8 | Image plane | Infinite | — | — |

Similarly, in the description of Table 3, Table 9 will not be described here.

Figure 16:
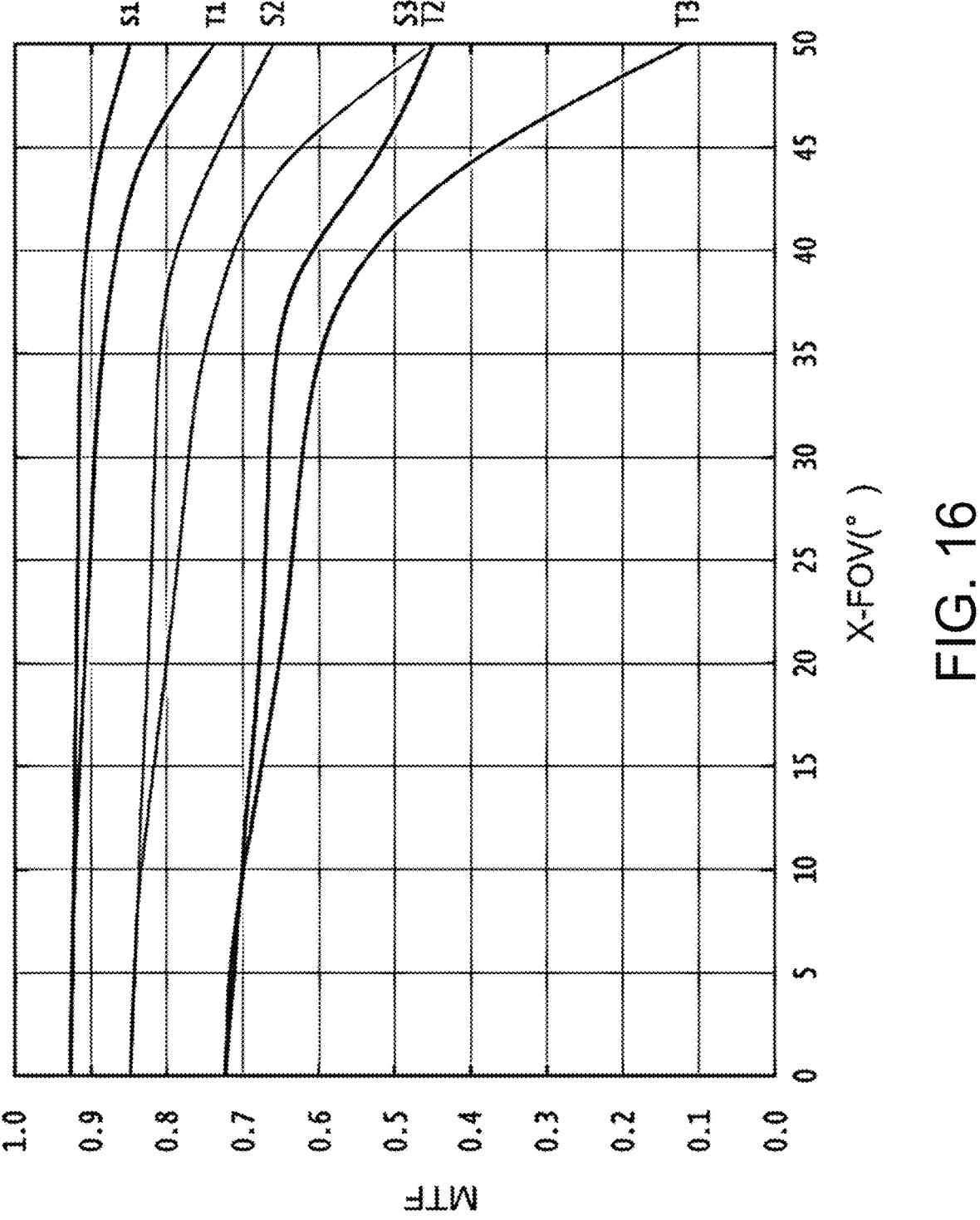
FIG. 16 a curve diagram between the MTF and field of view of the optical system working at the far-infrared waveband in one embodiment provided by the present application.

FIG. 16 shows a curve diagram between the MTF and field of view of the optical system working at the far-infrared waveband in one embodiment provided by the present application. Similarly, this embodiment 4 has the same principle as the description of the curve diagram between the MTF and FOV in embodiment 1, and will not be repeated here.

It should be noted that the optical system in this embodiment has an MTF of 0.1 at a cut-off frequency of 14 lp/mm of maximum FOV of 81.6°, an MTF of 0.51 at a cut-off frequency of 14 lp/mm and 0.8 times of FOV of 81.6°, and an MTF of 0.63 at a cut-off frequency of 14 lp/mm and the half of FOV of 51°.

Figure 17:
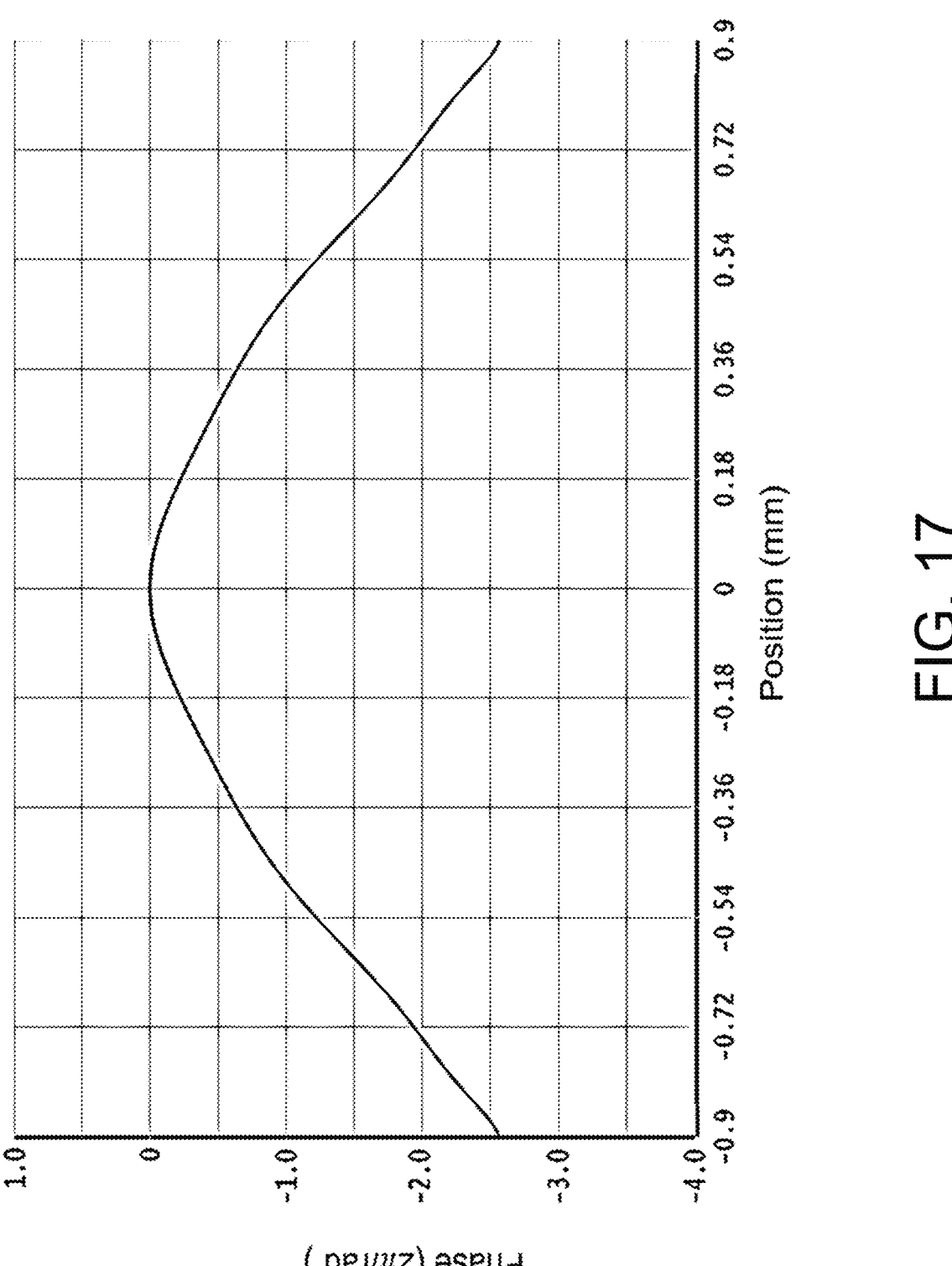
FIG. 17 shows a diagram of the phase distribution of the metalens.

FIG. 17 shows a diagram of the phase distribution of the metalens. The horizontal axis of the phase distribution represents the distance between any position of the metalens and the metalens center; the vertical axis of the phase represents any position of the metalens at the central wavelength of the far-infrared waveband. As shown in FIG. 17, the optical system in this embodiment provides the maximum phase variation between the phase at the central wavelength of the far-infrared waveband and from the center of the metalens to the edge of the metalens is 2.55 periodicities(2π).

Embodiment 5

Figure 18:
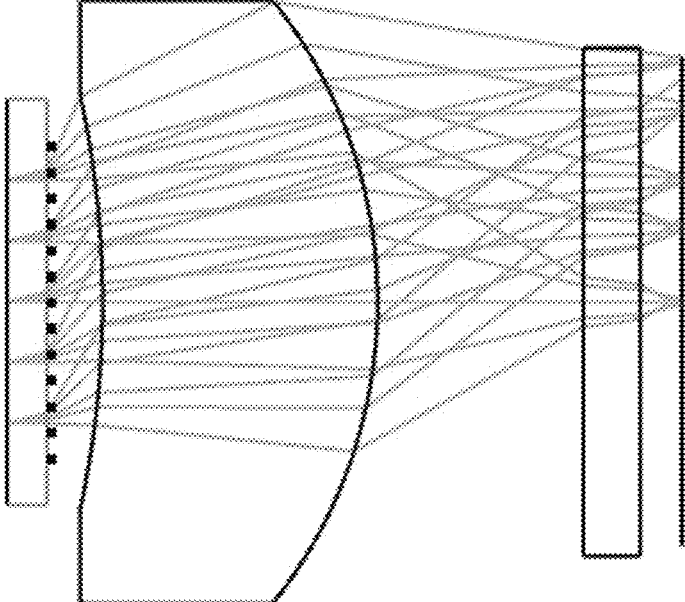
FIG. 18 shows a schematic diagram of the architectural layout of the optical system and the optical camera working at the far-infrared waveband in one embodiment provided by the present application.

FIG. 18 shows a schematic diagram of the architectural layout of the optical system and the optical camera working at the far-infrared waveband in one embodiment provided by the present application. As shown in FIG. 18, in the embodiment 5, the optical camera along the optical axis from the objection side to the image side includes: the optical system, optical window glass, imaging detector. Where the optical camera along the optical axis from the objection side to the image side includes: the aperture slot, the metalens and the spherical lens. The aperture slot is set on the objection-side surface towards the objection side of the metalens.

TABLE 10

| | Target requirements for the various system parameters of the optical system by the present embodiment 5 | |
|---|---|
| System Parameters | Optical system provided by embodiment 5 |
| Effective focal length of the optical system f (mm) | 1.61 |
| Exit pupil diameter of the optical system D (mm) | 1.8 |
| f/D | 0.89 |
| FOV(°) | ≥118.5 |
| TTL(mm) | 5 |
| Relative Illumination | >88% |

As can be seen from the Table 4, the F number (f/D) is 0.89, which can improve the light intake of the optical system significantly to ensure the good imaging quality. At the same time, the FOV of the optical system is greater than or equal to 118.5°, and can satisfy the requirement of larger FOV. At the same time, the TTL of the optical system is 5 mm, which can satisfy the requirement of small volume and light weight. At the same time, the relative illumination at all FOV is greater than 88%, which basically meets the requirements of the optical system for imaging brightness.

Along the direction from the objection side to the image side, each surface of the optical system is numbered, and after summarizing the parameters of each surface, Table 5 is obtained as shown below.

TABLE 8

| Number | Type of surface | Radius of curvature (mm) | Thickness (mm) | Material |
|---|---|---|---|---|
| 1 | Objection plane | Infinite | Infinite | — |
| 2 (Aperture slot) | Sphere plane | Infinite | 0.3 | Si |
| 3 | Metalens | Infinite | 0.410 | — |
| 4 | Sphere plane | −7.148 | 2.035 | Si |
| 5 | Sphere plane | −3.585 | 1.521 | — |
| 6 | Sphere plane | Infinite | 0.425 | Si |
| 7 | Sphere plane | Infinite | 0.31 | — |
| 8 | Image plane | Infinite | — | — |

Similarly, in the description of Table 3, Table 11 will not be described here.

Figure 19:
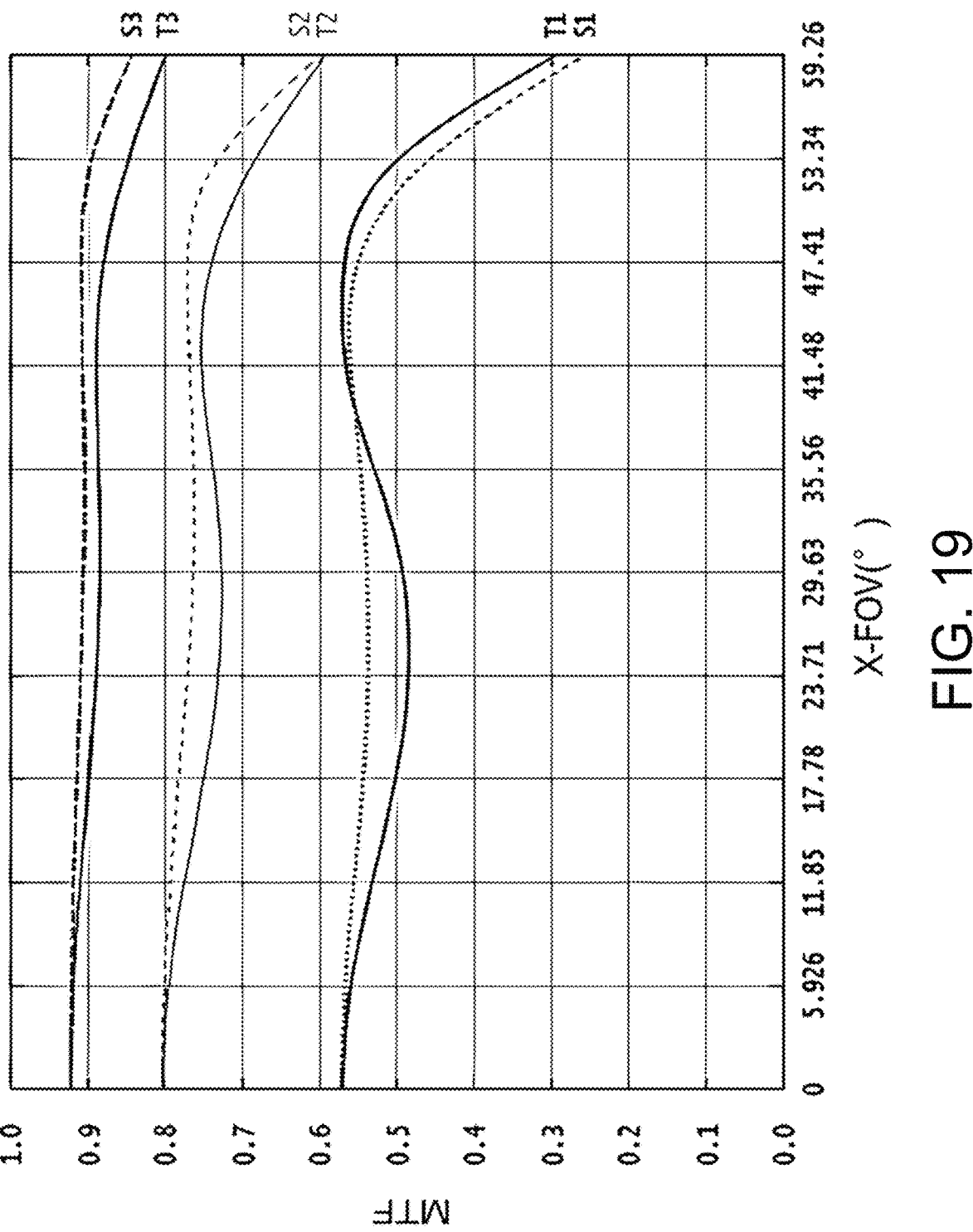
FIG. 19 shows a curve diagram between the MTF and field of view of the optical system working at the far-infrared waveband in one embodiment provided by the present application.

FIG. 19 shows a curve diagram between the MTF and field of view of the optical system working at the far-infrared waveband in one embodiment provided by the present application. Similarly, this embodiment 5 has the same principle as the description of the curve diagram between the MTF and FOV in embodiment 1, and will not be repeated here.

It should be noted that the optical system in this embodiment has an MTF of 0.26 at a cut-off frequency of 14 lp/mm of maximum FOV of 118.5°, an MTF of 0.55 at a cut-off frequency of 14 lp/mm and 0.8 times of FOV of 94.8°, and an MTF of 0.49 at a cut-off frequency of 14 lp/mm and the half of FOV of 59.3°.

Figure 20:
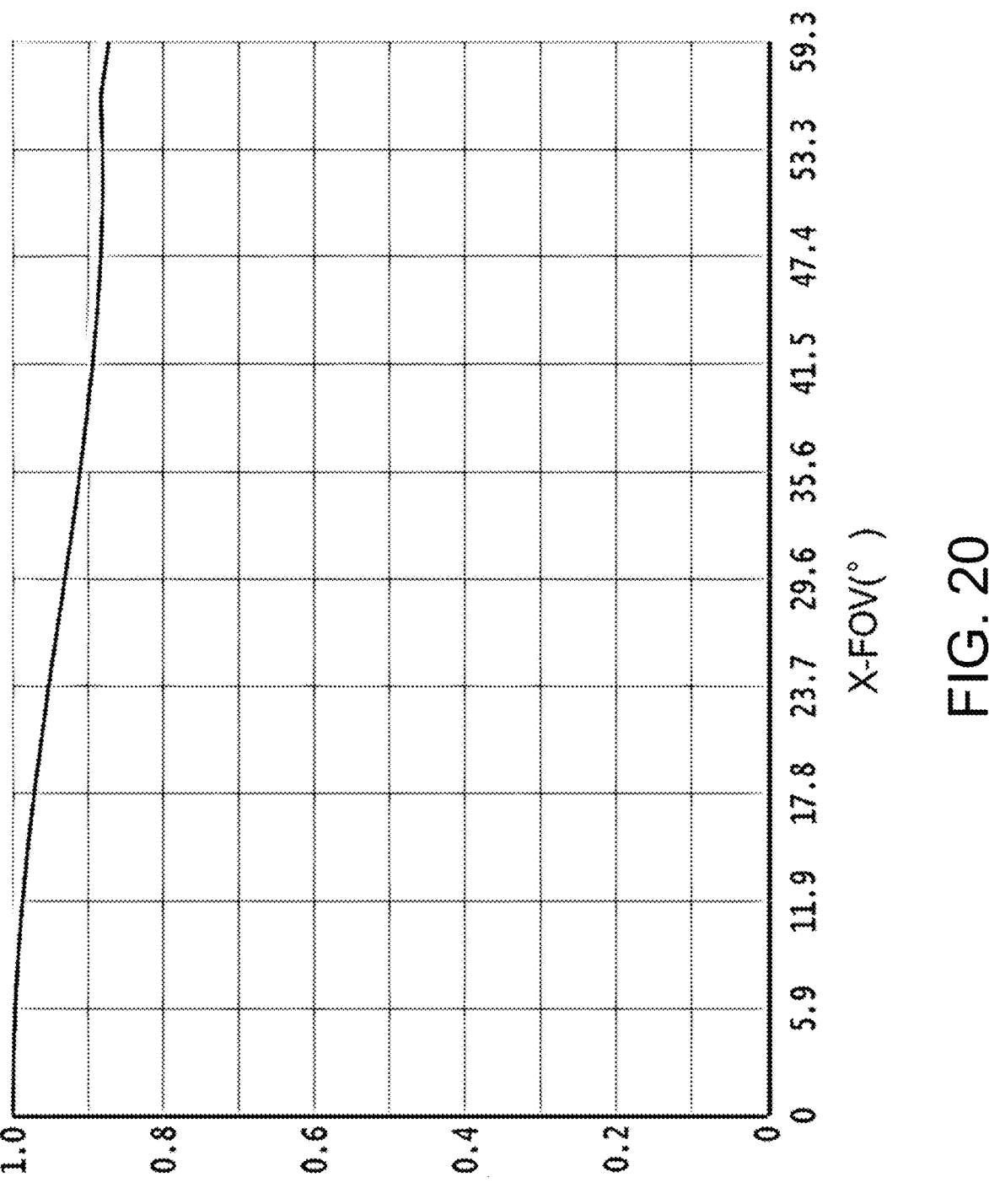
FIG. 20 shows a curve diagram of the relative illumination of the optical system working at the far-infrared waveband in one embodiment provided by the present application.

FIG. 20 shows a curve diagram of the relative illumination of the optical system working at the far-infrared waveband in one embodiment provided by the present application. As can be seen from FIG. 20, the optical system the relative illumination at all FOV is greater than 88%.

Figure 21:
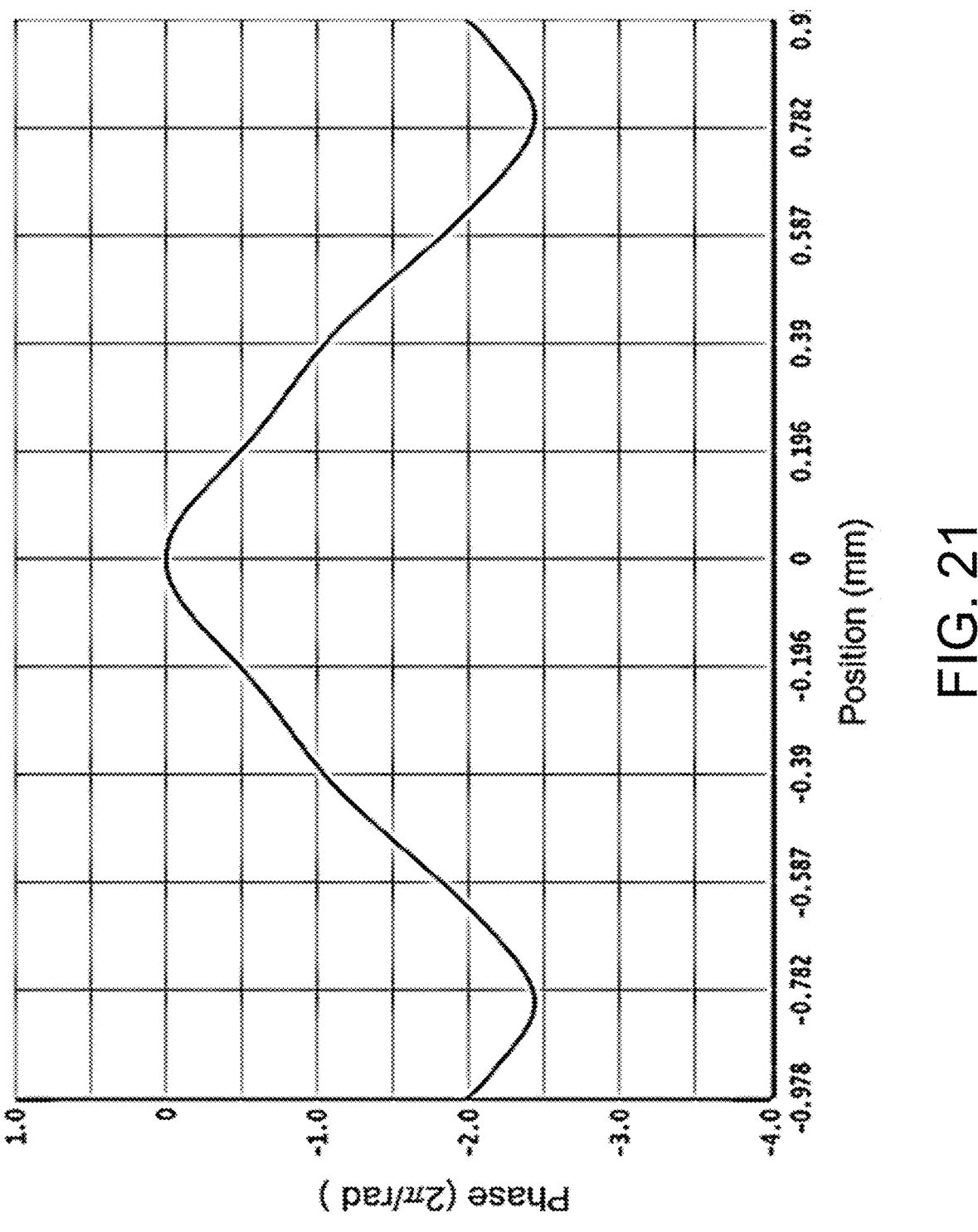
FIG. 21 shows a diagram of the phase distribution of the metalens.

FIG. 21 shows a diagram of the phase distribution of the metalens provided by the embodiment 5. The horizontal axis of the phase distribution represents the distance between any position of the metalens and the metalens center; the vertical axis of the phase represents any position of the metalens at the central wavelength of the far-infrared waveband. As shown in FIG. 21 the optical system in this embodiment provides the maximum phase variation between the phase at the central wavelength of the far-infrared waveband and from the center of the metalens to the edge of the metalens is 2.45 periodicities($2\pi$).

Embodiment 6

Figure 22:
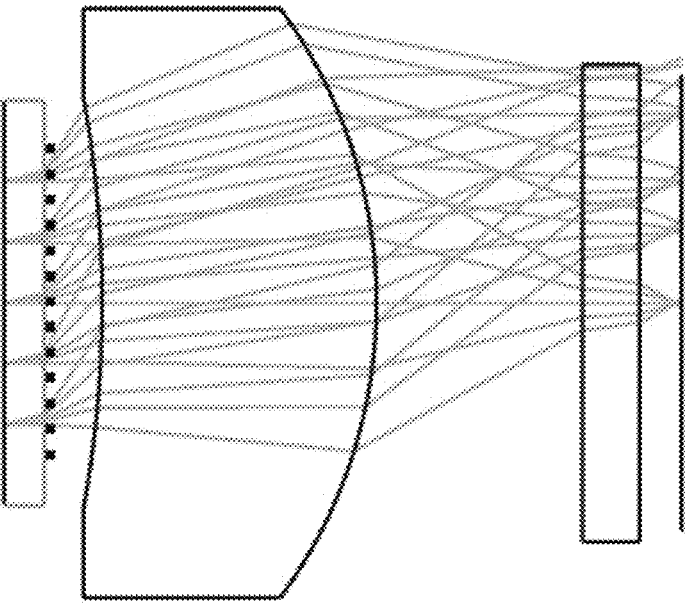
FIG. 22 shows a schematic diagram of the architectural layout of the optical system and the optical camera working at the far-infrared waveband in one embodiment provided by the present application.

FIG. 22 shows a schematic diagram of the architectural layout of the optical system and the optical camera working at the far-infrared waveband in one embodiment provided by the present application. As shown in FIG. 22, in the embodiment 6, the optical camera along the optical axis from the objection side to the image side includes: the optical system, optical window glass, imaging detector. Where the optical camera along the optical axis from the objection side to the image side includes: the aperture slot, the metalens and the spherical lens. The aperture slot is set on the objection-side surface towards the objection side of the metalens.

TABLE 12

| Target requirements for the various system parameters of the optical system by the present embodiment 6 | |
|---|---|
| System Parameters | Optical system provided by embodiment 6 |
| Effective focal length of the optical system f (mm) | 1.61 |
| Exit pupil diameter of the optical system D (mm) | 1.8 |
| f/D | 0.89 |
| FOV(°) | ≥118.5 |
| TTL(mm) | 5 |
| Relative Illumination | >92% |

As can be seen from the Table 4, the F number (f/D) is 0.89, which can improve the light intake of the optical system significantly to ensure the good imaging quality. At the same time, the FOV of the optical system is greater than or equal to 118.5°, and can satisfy the requirement of larger FOV. At the same time, the TTL of the optical system is 5 mm, which can satisfy the requirement of small volume and light weight. At the same time, the relative illumination at all FOV is greater than 92%, which basically meets the requirements of the optical system for imaging brightness.

Along the direction from the objection side to the image side, each surface of the optical system is numbered, and after summarizing the parameters of each surface, Table 13 is obtained as shown below.

TABLE 8

| Number | Type of surface | Radius of curvature (mm) | Thickness (mm) | Material |
|---|---|---|---|---|
| 1 | Objection plane | Infinite | Infinite | — |
| 2 (Aperture slot) | Sphere plane | Infinite | 0.3 | Si |
| 3 | Metalens | Infinite | 0.426 | — |
| 4 | Sphere plane | −8.486 | 2.023 | Si |
| 5 | Sphere plane | −3.697 | 1.516 | — |
| 6 | Sphere plane | Infinite | 0.425 | Si |
| 7 | Sphere plane | Infinite | 0.31 | — |
| 8 | Image plane | Infinite | — | — |

Similarly, in the description of Table 3, Table 13 will not be described here.

Figure 23:
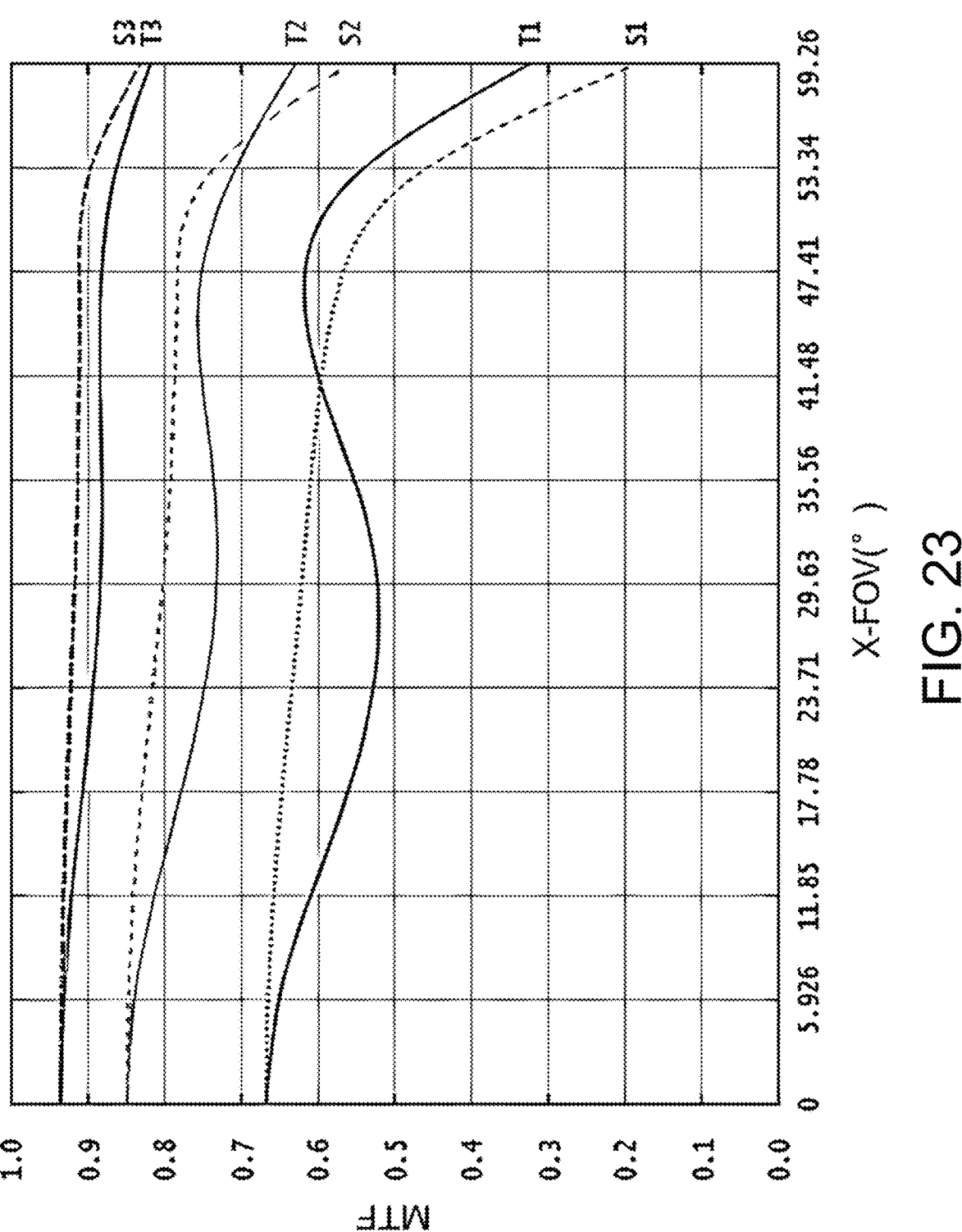
FIG. 23 shows a curve diagram between the MTF and field of view of the optical system working at the far-infrared waveband in one embodiment provided by the present application.

FIG. 23 shows a curve diagram between the MTF and field of view of the optical system working at the far-infrared waveband in one embodiment provided by the present application. Similarly, this embodiment 6 has the same principle as the description of the curve diagram between the MTF and FOV in embodiment 1, and will not be repeated here.

It should be noted that the optical system in this embodiment has an MTF of 0.19 at a cut-off frequency of 14 lp/mm of maximum FOV of 118.5°, an MTF of 0.57 at a cut-off frequency of 14 lp/mm and 0.8 times of FOV of 94.8°, and an MTF of 0.62 at a cut-off frequency of 14 lp/mm and the half of FOV of 59.3°.

Figure 24:
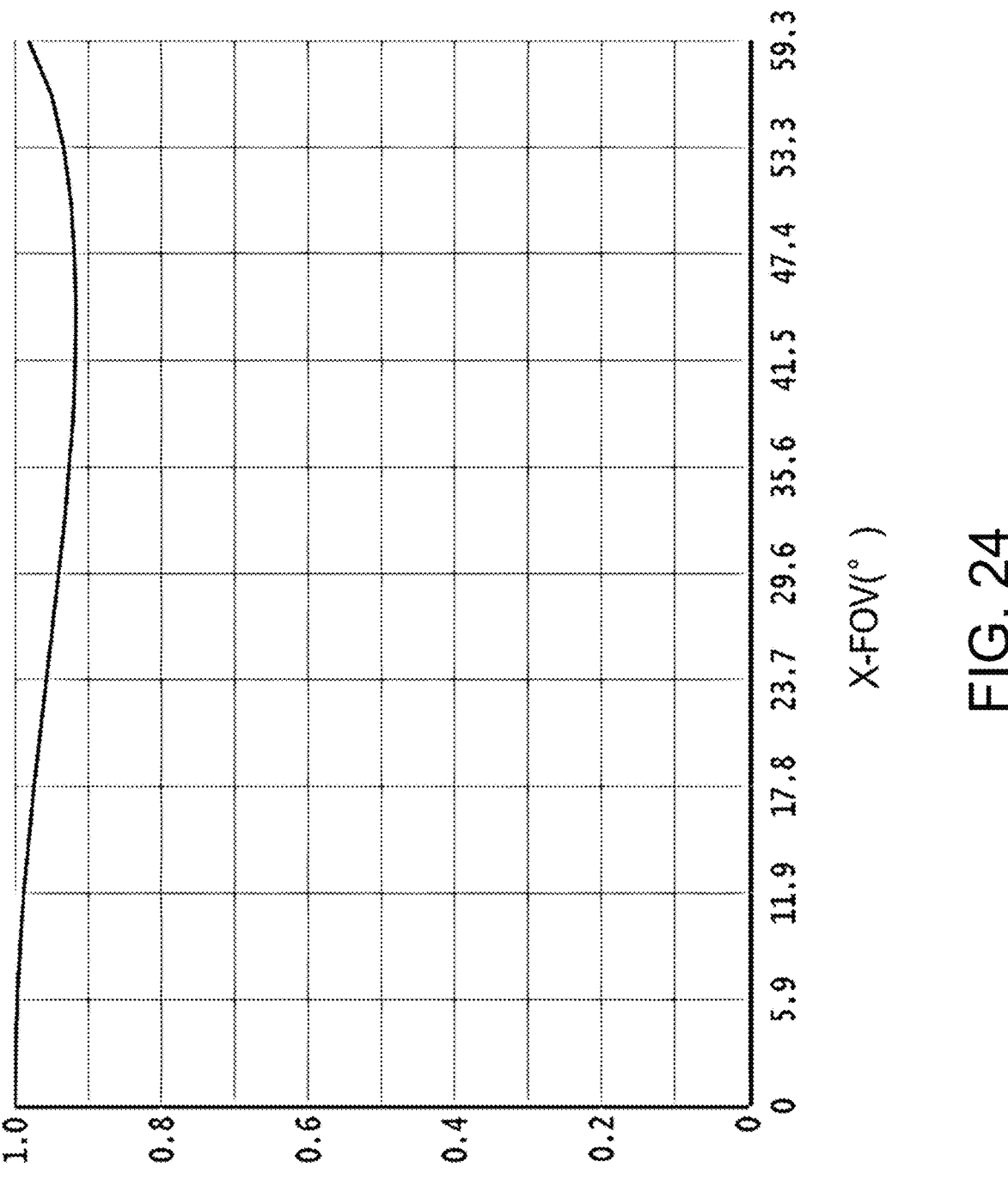
FIG. 24 shows a curve diagram of the relative illumination of the optical system working at the far-infrared waveband in one embodiment provided by the present application.

FIG. 24 shows a curve diagram of the relative illumination of the optical system working at the far-infrared waveband in one embodiment provided by the present application. As can be seen from FIG. 24, the optical system the relative illumination at all FOV is greater than 92%.

Figure 25:
FIG. 25 shows a diagram of the phase distribution of the metalens.

FIG. 25 shows a diagram of the phase distribution of the metalens provided by the embodiment 6. The horizontal axis of the phase distribution represents the distance between any position of the metalens and the metalens center; the vertical axis of the phase represents any position of the metalens at the central wavelength of the far-infrared waveband. As shown in FIG. 25 the optical system in this embodiment provides the maximum phase variation between the phase at the central wavelength of the far-infrared waveband and from the center of the metalens to the edge of the metalens is 1.7 periodicities($2\pi$).

Embodiment 7

Figure 26:
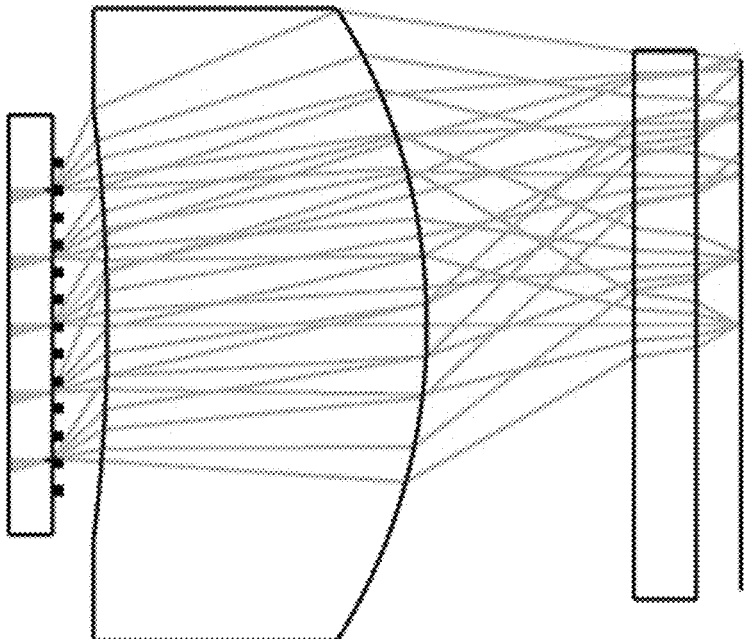
FIG. 26 shows a curve diagram of the relative illumination of the optical system working at the far-infrared waveband in one embodiment provided by the present application.

FIG. 26 shows a schematic diagram of the architectural layout of the optical system and the optical camera working at the far-infrared waveband in one embodiment provided by the present application. As shown in FIG. 26, in the embodiment 7, the optical camera along the optical axis from the objection side to the image side includes: the optical system, optical window glass, imaging detector. Where the optical camera along the optical axis from the objection side to the image side includes: the aperture slot, the metalens and the spherical lens. The aperture slot is set on the objection-side surface towards the objection side of the metalens.

TABLE 14

Target requirements for the various system parameters of the optical system by the present embodiment 7

| System Parameters | Optical system provided by embodiment 7 |
|---|---|
| Effective focal length of the optical system f (mm) | 1.54 |
| Exit pupil diameter of the optical system D (mm) | 1.8 |
| f/D | 0.86 |
| FOV(°) | ≥118.5 |
| TTL(mm) | 5 |
| Relative Illumination | >93% |

As can be seen from the Table 4, the F number (f/D) is 0.86, which can improve the light intake of the optical system significantly to ensure the good imaging quality. At the same time, the FOV of the optical system is greater than or equal to 118.9°, and can satisfy the requirement of larger FOV. At the same time, the TTL of the optical system is 5 mm, which can satisfy the requirement of small volume and light weight. At the same time, the relative illumination at all FOV is greater than 93%, which basically meets the requirements of the optical system for imaging brightness.

Along the direction from the objection side to the image side, each surface of the optical system is numbered, and after summarizing the parameters of each surface, Table 13 is obtained as shown below.

TABLE 8

| Number | Type of surface | Radius of curvature (mm) | Thickness (mm) | Material |
|---|---|---|---|---|
| 1 | Objection plane | Infinite | Infinite | — |
| 2 (Aperture slot) | Sphere plane | Infinite | 0.3 | Si |
| 3 | Metalens | Infinite | 0.375 | — |
| 4 | Sphere plane | −10.937 | 2.180 | Si |
| 5 | Sphere plane | −3.927 | 1.410 | — |
| 6 | Sphere plane | Infinite | 0.425 | Si |
| 7 | Sphere plane | Infinite | 0.31 | — |
| 8 | Image plane | Infinite | — | — |

Similarly, in the description of Table 3, Table 15 will not be described here.

Figure 27:
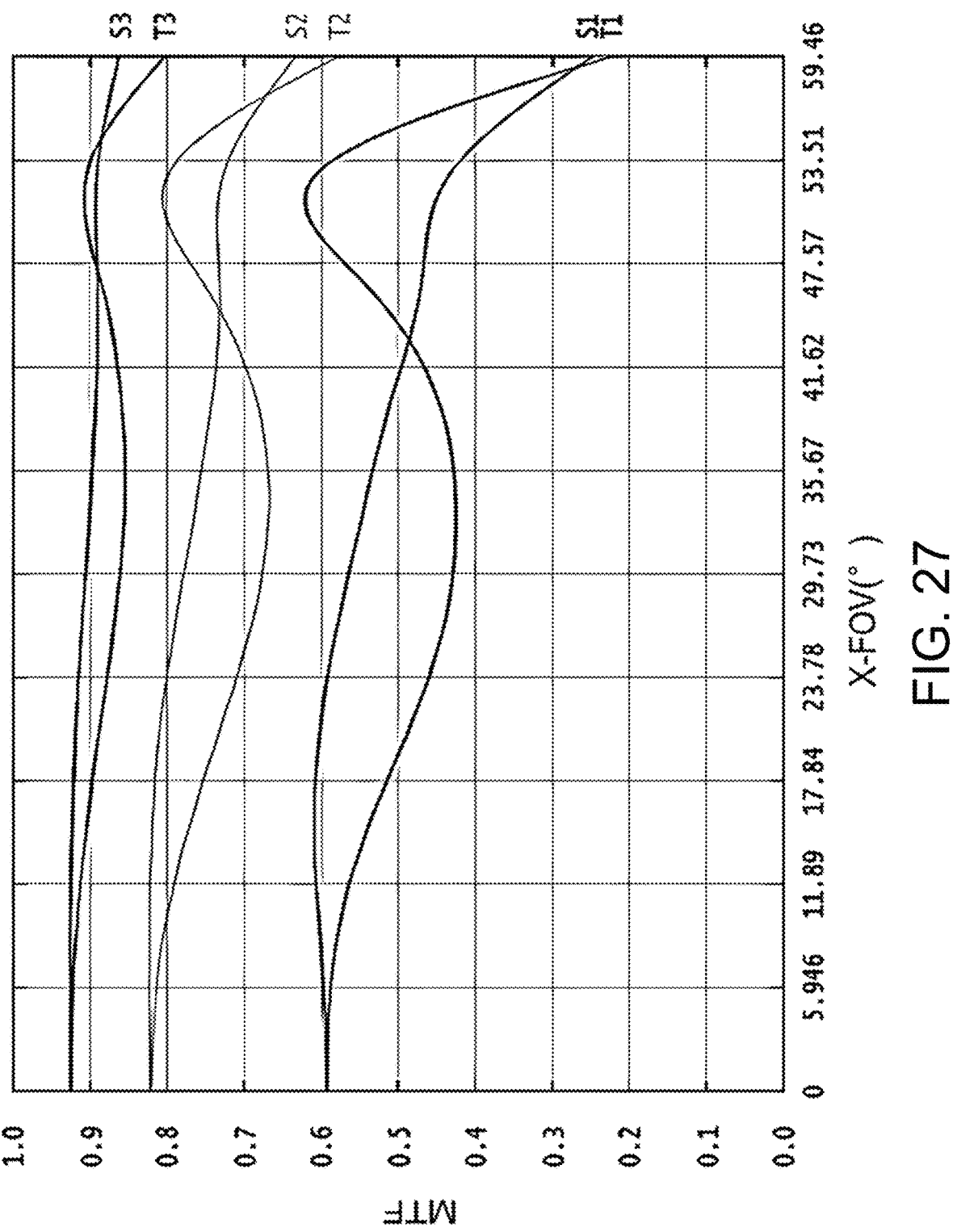
FIG. 27 shows a curve diagram between the MTF and field of view of the optical system working at the far-infrared waveband in one embodiment provided by the present application.

FIG. 27 shows a curve diagram between the MTF and field of view of the optical system working at the far-infrared waveband in one embodiment provided by the present application. Similarly, this embodiment 6 has the same principle as the description of the curve diagram between the MTF and FOV in embodiment 1, and will not be repeated here.

It should be noted that the optical system in this embodiment has an MTF of 0.22 at a cut-off frequency of 14 lp/mm of maximum FOV of 118.5°, an MTF of 0.47 at a cut-off frequency of 14 lp/mm and 0.8 times of FOV of 95.1°, and an MTF of 0.43 at a cut-off frequency of 14 lp/mm and the half of FOV of 59.5°.

Figure 28:
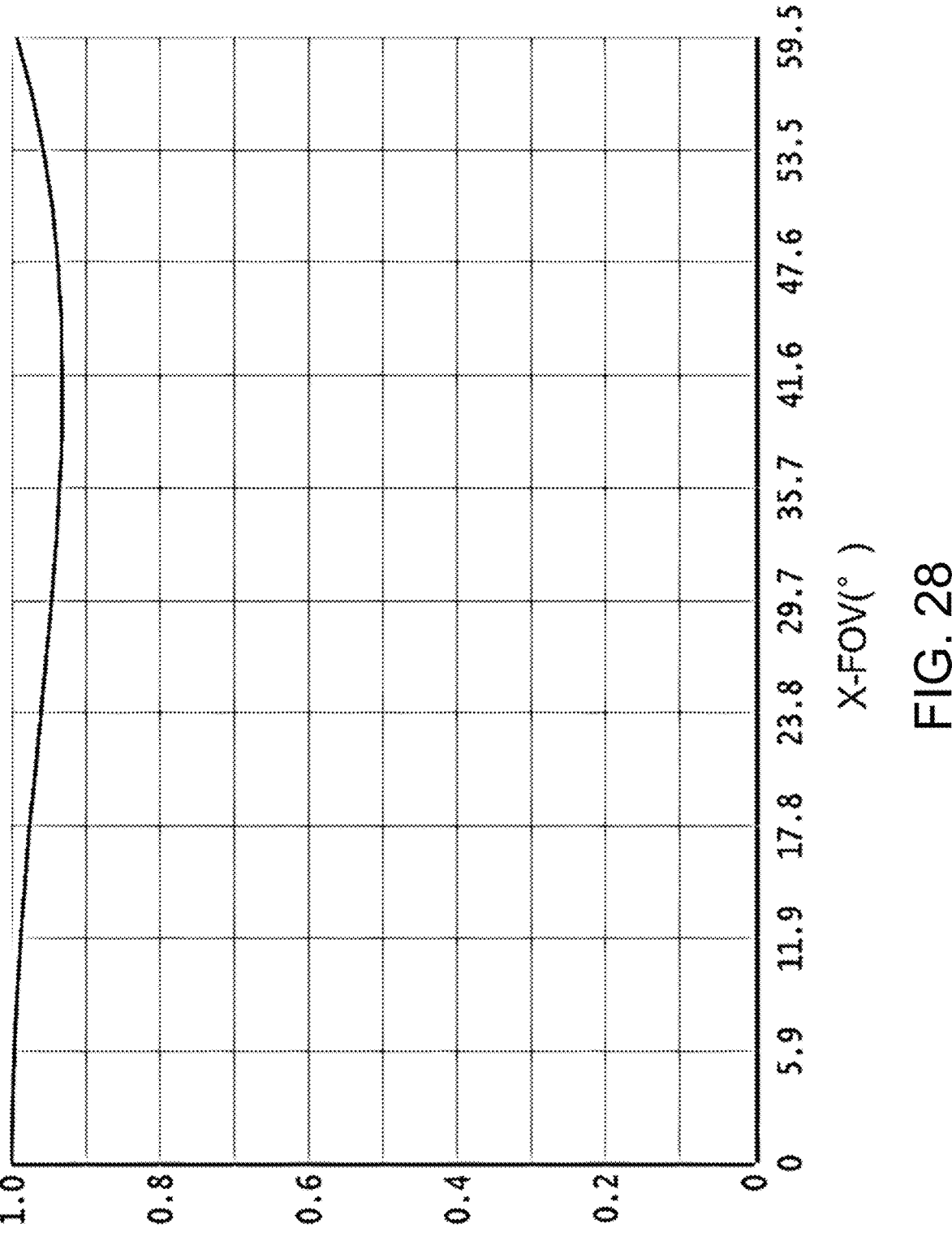
FIG. 28 shows a shows a curve diagram of the relative illumination of the optical system working at the far-infrared waveband in one embodiment provided by the present application.

FIG. 28 shows a curve diagram of the relative illumination of the optical system working at the far-infrared waveband in the embodiment 7 provided by the present application. As can be seen from FIG. 28, the optical system the relative illumination at all FOV is greater than 93%.

Figure 29:
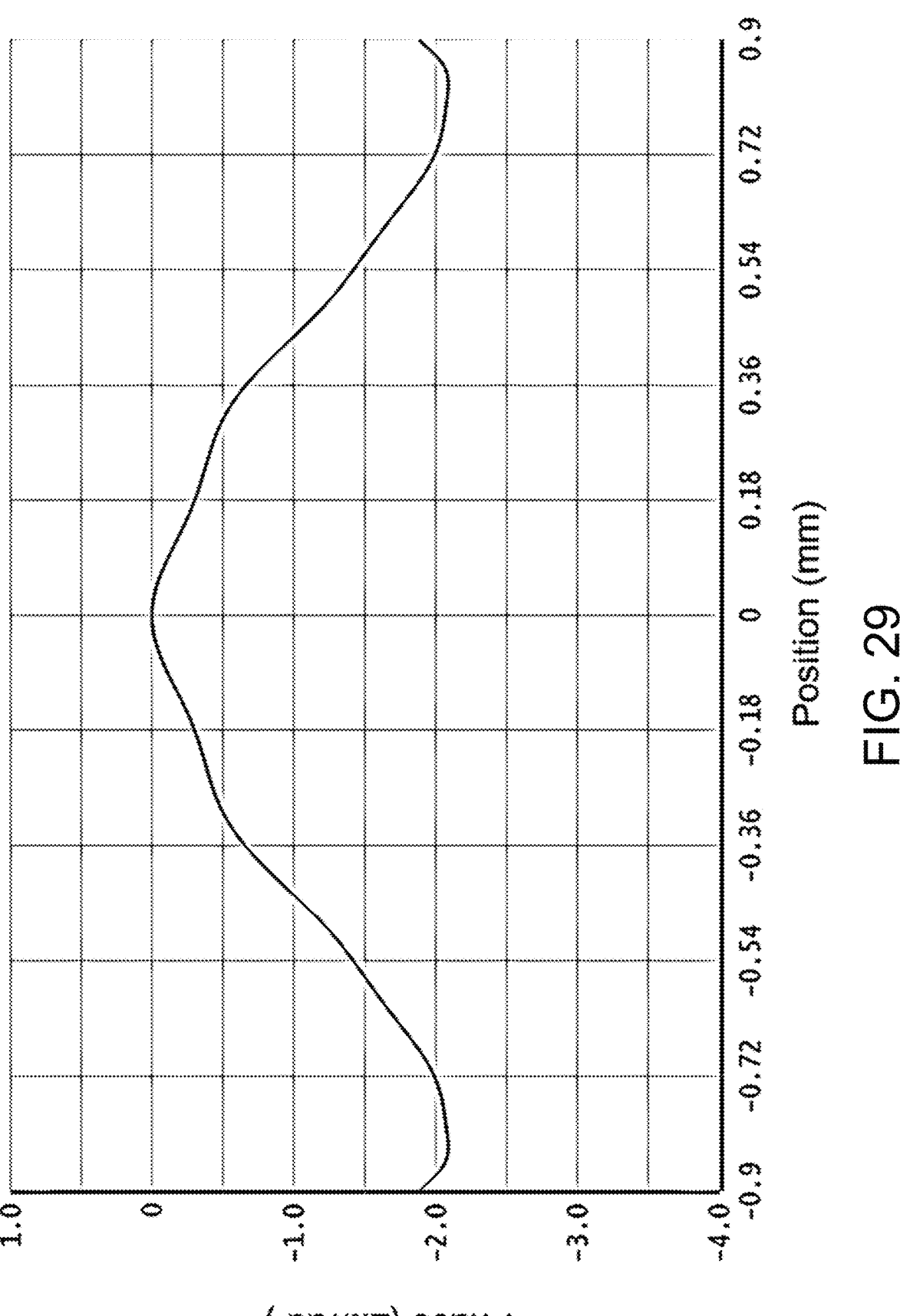
FIG. 29 shows a diagram of the phase distribution of the metalens.

FIG. 29 shows a diagram of the phase distribution of the metalens provided by the embodiment 7. The horizontal axis of the phase distribution represents the distance between any position of the metalens and the metalens center; the vertical axis of the phase represents any position of the metalens at the central wavelength of the far-infrared waveband. As shown in FIG. 29 the optical system in this embodiment provides the maximum phase variation between the phase at the central wavelength of the far-infrared waveband and from the center of the metalens to the edge of the metalens is 2.1 periodicities($2\pi$).

After summarizing the lens parameters of the optical system provided by the above seven embodiments, Table 16 is shown below. The displays in Table 16 mainly are used to explain the conditions met by the optical system provided in this application, and are experimentally verified and supported.

TABLE 16

The lens parameters of the optical system provided by the present embodiments

| Lens Parameters | Embodiment1 | Embodimen2 | Embodimen3 | Embodimen4 | Embodimen5 | Embodimen6 | Embodimen7 |
|---|---|---|---|---|---|---|---|
| Focal length of metalens $f_M$ (mm) | 2.202 | 1.87 | 1.54 | 1.53 | 2.73 | 2.9 | 2.56 |
| $f_M/f$ | 1.48 | 1.32 | 1.1 | 1.02 | 1.70 | 1.80 | 1.66 |
| Focal length of spherical lens $f_G$(mm) | 2.129 | 2.162 | 2.401 | 2.626 | 2.12 | 2.08 | 2.07 |

TABLE 16-continued

The lens parameters of the optical system provided by the present embodiments

| Lens Parameters | Embodiment1 | Embodimen2 | Embodimen3 | Embodimen4 | Embodimen5 | Embodimen6 | Embodimen7 |
|---|---|---|---|---|---|---|---|
| $f_G/f$ | 1.43 | 1.52 | 1.715 | 1.75 | 1.32 | 1.29 | 1.34 |
| Central thickness of metalens $d_M$ (mm) | 0.3 | 0.3 | 0.3 | 0.3 | 0.3 | 0.3 | 0.3 |
| Central thickness of spherical lens $d_G$ (mm) | 1.5971 | 1.31 | 1.97 | 2.2 | 2.03 | 2.02 | 2.18 |
| Effective radius of spherical lens $R_M$ (mm) | 0.942 | 0.842 | 0.948 | 0.909 | 0.98 | 0.98 | 0.98 |
| Effective radius of spherical lens $R_G$ (mm) | 2.297 | 1.647 | 1.8 | 1.91 | 2.23 | 2.18 | 2.11 |
| $R_M/R_G$ | 0.41 | 0.51 | 0.53 | 0.48 | 0.44 | 0.45 | 0.46 |
| Curvature radius of objection-side of spherical lens $r_1$(mm) | −7.2313 | −4.081 | −3.906 | −3.325 | −7.15 | −8.49 | −10.94 |
| Curvature radius of image-side of spherical lens $r_2$(mm) | −3.48 | −2.814 | −3.169 | −3.205 | −3.59 | −3.7 | −3.93 |
| $r_1/r_2$ | 2.08 | 1.45 | 1.23 | 1.037 | 1.99 | 2.3 | 2.78 |
| Refractive index of metalens $n_M$ | 3.42 | 3.42 | 3.42 | 3.42 | 3.42 | 3.42 | 3.42 |
| Refractive index of spherical lens $n_G$ | 3.42 | 3.42 | 3.42 | 3.42 | 3.42 | 3.42 | 3.42 |
| The maximum phase variation Δφ (2π/rad) | 2.1 | 2.6 | 2.75 | 2.55 | 2.45 | 1.7 | 2.1 |
| $f_M Δφ/R_M$ | 4.91046 | 5.7783 | 4.466 | 4.2993 | 6.825 | 5.017 | 5.4784 |

The above is only a specific embodiment of the embodiments of this disclosure, but the scope of protection of the embodiment of this disclosure is not limited to this. And those skilled in the field can easily think of any change or substitution for this disclosure, which should be covered within the protection scope of this disclosure. Therefore, the scope of the protection of the present disclosure shall be the scope of the claims.

What is claimed is:

1. An optical system working at a far-infrared waveband, wherein the optical system along an optical axis from an objection side to an image side comprises: a metalens and a spherical lens;

the metalens is configured to correct a plurality of higher-order residual wavefront aberrations;

the spherical lens is configured to correct a plurality of lower-order primary wavefront aberrations;

the metalens and the spherical lens are configured to correct a plurality of aberrations;

an absolute value of a curvature radius of an objection-side surface towards the objection side for the spherical lens is greater than an absolute value of a curvature radius of an image-side surface towards the image side for the spherical lens;

the optical system satisfies the following condition expression:

$$0.83 \leq f/D \leq 0.92$$

wherein f is an effective focal length of the optical system, and D is an entrance pupil diameter of the optical system.

2. The optical system according to claim 1, wherein the optical system further satisfies:

$$4.2 < f_M Δφ/R_M < 6.9$$

wherein $f_M$ is a focal length of the metalens, Δφ is a biggest phase variation of the metalens at a single wavelength, and $R_M$ is an effective radius of the metalens.

3. The optical system according to claim 1, wherein the optical system further satisfies:

$$1.0 < r_1/r_2 < 2.8$$

wherein $r_1$ is the curvature radius of the objection-side surface towards the objection side for the spherical lens, and $r_2$ is the curvature radius of the image-side surface towards the image side for the spherical lens.

4. The optical system according to claim 1, wherein the optical system further satisfies:

$$0.40 \leq R_M/R_G \leq 0.55$$

wherein $R_M$ is an effective radius of the metalens, and $R_G$ is an effective radius of the spherical lens.

5. The optical system according to claim 1, wherein the optical system further satisfies:

$$1 < f_M/f \leq 1.85$$

wherein $f_M$ is a focal length of the metalens.

6. The optical system according to claim 1, wherein the optical system further satisfies:

$$1.25 \le f_G/f \le 1.75$$

wherein $f_G$ is a focal length of the spherical lens.

7. The optical system according to claim 1, wherein the optical system further satisfies:

$$3.3 \le n_M \le 4.3$$

$$3.3 \le n_G \le 4.3$$

wherein $n_M$ is a refractive index of the metalens, and $n_G$ is a refractive index of the spherical lens.

8. The optical system according to claim 1, wherein the optical system further comprises:
an aperture slot; the aperture slot is set on a surface of the metalens.

9. The optical system according to claim 1, wherein the optical system further comprises:
an aperture slot; an interval is set between the aperture slot and the metalens.

10. The optical system according to claim 1, wherein a total track length of the optical system is less than or equal to 5 mm.

11. The optical system according to claim 1, wherein a field of view for the optical system further satisfies:

$$100° \le FOV \le 120°$$

wherein FOV is the field of view of the optical system.

12. The optical system according to claim 1, wherein a relative illumination at an overall field of view of the optical system is greater than 60%.

13. The optical system according to claim 1, wherein the metalens and the spherical lens are made of intrinsic silicon.

14. The optical system according to claim 1, wherein a plurality of nanostructures are set on an image-side surface of the metalens.

15. The optical system according to claim 1, wherein the optical system further satisfies:

$$2\,\text{mm} \le d_M \le 0.375\,\text{mm}$$

wherein $d_M$ is a central thickness of the metalens.

16. The optical system according to claim 1, wherein the optical system further satisfies:

$$1.2\,\text{mm} \le d_G \le 2.25\,\text{mm}$$

Wherein $d_G$ is a central thickness of the spherical lens.

17. An optical camera working at a far-infrared waveband, wherein the optical camera comprises the optical system according to claim 1 and an imaging detector;
the imaging detector is setting on an image-side surface towards the image side for the metalens.

18. The optical camera according to claim 17, wherein the optical camera further comprises an optical window glass, and the optical window glass is set between the optical system and the imaging detector.

19. The optical camera according to claim 18, wherein the optical camera further comprises an optical window glass, and the optical window glass is set between the spherical lens and the imaging detector.

* * * * *